US012484116B2

(12) United States Patent
Collett et al.

(10) Patent No.: US 12,484,116 B2
(45) Date of Patent: Nov. 25, 2025

(54) ELECTRONIC SMOKING ARTICLE COMPRISING ONE OR MORE MICROHEATERS

(71) Applicant: RAI STRATEGIC HOLDINGS, INC., Winston-Salem, NC (US)

(72) Inventors: William Robert Collett, Lexington, NC (US); Stephen Benson Sears, Siler City, NC (US); Dennis Lee Potter, Kernersville, NC (US); Steven Lee Alderman, Lewisville, NC (US); Mo Kebaili, Irvine, CA (US)

(73) Assignee: RAI STRATEGIC HOLDINGS, INC., Winston-Salem, NC (US)

( * ) Notice: Subject to any disclaimer, the term of this patent is extended or adjusted under 35 U.S.C. 154(b) by 155 days.

(21) Appl. No.: 17/843,563

(22) Filed: Jun. 17, 2022

(65) Prior Publication Data

US 2022/0322495 A1 Oct. 6, 2022

Related U.S. Application Data

(63) Continuation of application No. 17/327,388, filed on May 21, 2021, now Pat. No. 11,825,567, which is a (Continued)

(51) Int. Cl.
*A24F 47/00* (2020.01)
*A24F 40/30* (2020.01)

(Continued)

(52) U.S. Cl.
CPC ............ *H05B 3/265* (2013.01); *A24F 40/30* (2020.01); *A24F 40/42* (2020.01); *A24F 40/46* (2020.01);

(Continued)

(58) Field of Classification Search
None
See application file for complete search history.

(56) References Cited

U.S. PATENT DOCUMENTS 1,771,366 A 7/1930 Wyss et al.
2,057,353 A 10/1936 Whittemore, Jr.

(Continued)

FOREIGN PATENT DOCUMENTS

AU 276250 7/1965
CA 2 641 869 5/2010

(Continued)

OTHER PUBLICATIONS

Communication of Notice of Opposition issued Jul. 21, 2025, in corresponding European Application No. 22155344.9.

*Primary Examiner* — Eric Yaary
(74) *Attorney, Agent, or Firm* — Womble Bond Dickinson (US) LLP

(57) ABSTRACT

The present disclosure relates to an electronic smoking article that provides for improved aerosol delivery. Particularly, the article comprises one or more microheaters. In various embodiments, the microheaters provide for improved control of vaporization of an aerosol precursor composition and provide for reduced power requirements to achieve consistent aerosolization. The present disclosure further relates to methods of forming an aerosol in a smoking article.

11 Claims, 9 Drawing Sheets

Related U.S. Application Data continuation of application No. 16/722,794, filed on Dec. 20, 2019, now Pat. No. 11,044,950, which is a continuation of application No. 15/982,411, filed on May 17, 2018, now abandoned, which is a continuation of application No. 14/512,561, filed on Oct. 13, 2014, now Pat. No. 9,980,512, which is a continuation of application No. 13/602,871, filed on Sep. 4, 2012, now Pat. No. 8,881,737.

(51) Int. Cl.

*A24F 40/42* (2020.01)
*A24F 40/46* (2020.01)
*A24F 40/51* (2020.01)
*H05B 3/26* (2006.01)
*A24F 40/10* (2020.01)
*A24F 40/20* (2020.01)

(52) U.S. Cl.

CPC .............. *A24F 40/51* (2020.01); *A24F 40/10* (2020.01); *A24F 40/20* (2020.01); *H05B 2203/003* (2013.01)

(56) References Cited

U.S. PATENT DOCUMENTS

| | | | |
|---|---|---|---|
| 2,104,266 | A | 1/1938 | McCormick |
| 2,805,669 | A | 9/1957 | Meriro |
| 3,200,819 | A | 8/1965 | Gilbert |
| 3,316,919 | A | 5/1967 | Green et al. |
| 3,398,754 | A | 8/1968 | Tughan |
| 3,419,015 | A | 12/1968 | Wochnowski |
| 3,424,171 | A | 1/1969 | Rooker |
| 3,476,118 | A | 11/1969 | Luttich |
| 4,054,145 | A | 10/1977 | Berndt et al. |
| 4,131,117 | A | 12/1978 | Kite et al. |
| 4,150,677 | A | 4/1979 | Osborne |
| 4,190,046 | A | 2/1980 | Virag |
| 4,219,032 | A | 8/1980 | Tabatznik et al. |
| 4,259,970 | A | 4/1981 | Green, Jr. |
| 4,284,089 | A | 8/1981 | Ray |
| 4,303,083 | A | 12/1981 | Burruss, Jr. |
| 4,449,541 | A | 5/1984 | Mays et al. |
| 4,490,939 | A | 1/1985 | Kennedy et al. |
| 4,506,682 | A | 3/1985 | Muller |
| 4,635,651 | A | 1/1987 | Jacobs |
| 4,674,519 | A | 6/1987 | Keritsis et al. |
| 4,708,151 | A | 11/1987 | Shelar |
| 4,714,082 | A | 12/1987 | Banerjee et al. |
| 4,735,217 | A | 4/1988 | Gerth et al. |
| 4,756,318 | A | 7/1988 | Clearman et al. |
| 4,771,295 | A | 9/1988 | Baker et al. |
| 4,771,795 | A | 9/1988 | White et al. |
| 4,776,353 | A | 10/1988 | Lilja et al. |
| 4,793,365 | A | 12/1988 | Sensabaugh, Jr. et al. |
| 4,800,903 | A | 1/1989 | Ray et al. |
| 4,819,665 | A | 4/1989 | Roberts et al. |
| 4,821,749 | A | 4/1989 | Toft et al. |
| 4,830,028 | A | 5/1989 | Lawson et al. |
| 4,836,224 | A | 6/1989 | Lawson et al. |
| 4,836,225 | A | 6/1989 | Sudoh |
| 4,848,374 | A | 7/1989 | Chard et al. |
| 4,848,376 | A | 7/1989 | Lilja et al. |
| 4,874,000 | A | 10/1989 | Tamol et al. |
| 4,880,018 | A | 11/1989 | Graves, Jr. et al. |
| 4,887,619 | A | 12/1989 | Burcham, Jr. et al. |
| 4,907,606 | A | 3/1990 | Lilja et al. |
| 4,913,168 | A | 4/1990 | Potter et al. |
| 4,917,119 | A | 4/1990 | Potter et al. |
| 4,917,128 | A | 4/1990 | Clearman et al. |
| 4,922,901 | A | 5/1990 | Brooks et al. |
| 4,924,888 | A | 5/1990 | Perfetti et al. |
| 4,928,714 | A | 5/1990 | Shannon |
| 4,938,236 | A | 7/1990 | Banerjee et al. |
| 4,941,483 | A | 7/1990 | Ridings et al. |
| 4,941,484 | A | 7/1990 | Clapp et al. |
| 4,945,931 | A | 8/1990 | Gori |
| 4,947,874 | A | 8/1990 | Brooks et al. |
| 4,947,875 | A | 8/1990 | Brooks et al. |
| 4,972,854 | A | 11/1990 | Kiernan et al. |
| 4,972,855 | A | 11/1990 | Kuriyama et al. |
| 4,986,286 | A | 1/1991 | Roberts et al. |
| 4,987,906 | A | 1/1991 | Young et al. |
| 5,005,593 | A | 4/1991 | Fagg |
| 5,019,122 | A | 5/1991 | Clearman et al. |
| 5,022,416 | A | 6/1991 | Watson |
| 5,042,510 | A | 8/1991 | Curtiss et al. |
| 5,056,537 | A | 10/1991 | Brown et al. |
| 5,060,669 | A | 10/1991 | White et al. |
| 5,060,671 | A | 10/1991 | Counts et al. |
| 5,065,775 | A | 11/1991 | Fagg |
| 5,072,744 | A | 12/1991 | Luke et al. |
| 5,074,319 | A | 12/1991 | White et al. |
| 5,076,296 | A | 12/1991 | Nystrom et al. |
| 5,093,894 | A | 3/1992 | Deevi et al. |
| 5,095,921 | A | 3/1992 | Losee et al. |
| 5,097,850 | A | 3/1992 | Braunshteyn et al. |
| 5,099,862 | A | 3/1992 | White et al. |
| 5,099,864 | A | 3/1992 | Young et al. |
| 5,103,842 | A | 4/1992 | Strang et al. |
| 5,121,757 | A | 6/1992 | White et al. |
| 5,129,409 | A | 7/1992 | White et al. |
| 5,131,415 | A | 7/1992 | Munoz et al. |
| 5,143,097 | A | 9/1992 | Sohn et al. |
| 5,144,962 | A | 9/1992 | Counts et al. |
| 5,146,934 | A | 9/1992 | Deevi et al. |
| 5,159,940 | A | 11/1992 | Hayward et al. |
| 5,159,942 | A | 11/1992 | Brinkley et al. |
| 5,179,966 | A | 1/1993 | Losee et al. |
| 5,211,684 | A | 5/1993 | Shannon et al. |
| 5,220,930 | A | 6/1993 | Gentry |
| 5,224,498 | A | 7/1993 | Deevi et al. |
| 5,228,460 | A | 7/1993 | Sprinkel, Jr. et al. |
| 5,230,354 | A | 7/1993 | Smith et al. |
| 5,235,992 | A | 8/1993 | Sensabaugh |
| 5,243,999 | A | 9/1993 | Smith |
| 5,246,018 | A | 9/1993 | Deevi et al. |
| 5,249,586 | A | 10/1993 | Morgan et al. |
| 5,261,424 | A | 11/1993 | Sprinkel, Jr. |
| 5,269,327 | A | 12/1993 | Counts et al. |
| 5,285,798 | A | 2/1994 | Banerjee et al. |
| 5,293,883 | A | 3/1994 | Edwards |
| 5,301,694 | A | 4/1994 | Raymond |
| 5,303,720 | A | 4/1994 | Banerjee et al. |
| 5,318,050 | A | 6/1994 | Gonzalez-Parra et al. |
| 5,322,075 | A | 6/1994 | Deevi et al. |
| 5,322,076 | A | 6/1994 | Brinkley et al. |
| 5,339,838 | A | 8/1994 | Young et al. |
| 5,345,951 | A | 9/1994 | Serrano et al. |
| 5,353,813 | A | 10/1994 | Deevi et al. |
| 5,357,984 | A | 10/1994 | Farrier et al. |
| 5,360,023 | A | 11/1994 | Blakley et al. |
| 5,369,723 | A | 11/1994 | Counts et al. |
| 5,372,148 | A | 12/1994 | McCafferty et al. |
| 5,377,698 | A | 1/1995 | Litzinger et al. |
| 5,388,574 | A | 2/1995 | Ingebrethsen et al. |
| 5,388,594 | A | 2/1995 | Counts et al. |
| 5,408,574 | A | 4/1995 | Deevi et al. |
| 5,435,325 | A | 7/1995 | Clapp et al. |
| 5,445,169 | A | 8/1995 | Brinkley et al. |
| 5,468,266 | A | 11/1995 | Bensalem et al. |
| 5,468,936 | A | 11/1995 | Deevi et al. |
| 5,479,948 | A | 1/1996 | Counts et al. |
| 5,498,850 | A | 3/1996 | Das |
| 5,498,855 | A | 3/1996 | Deevi et al. |
| 5,499,636 | A | 3/1996 | Baggett, Jr. et al. |
| 5,501,237 | A | 3/1996 | Young et al. |
| 5,505,214 | A | 4/1996 | Collins et al. |
| 5,530,225 | A | 6/1996 | Hajaligol |
| 5,551,450 | A | 9/1996 | Hemsley |
| 5,551,451 | A | 9/1996 | Riggs et al. |
| 5,564,442 | A | 10/1996 | MacDonald et al. |
| 5,573,692 | A | 11/1996 | Das et al. |

(56) References Cited

U.S. PATENT DOCUMENTS 5,591,368 A 1/1997 Fleischhauer et al.
5,593,792 A 1/1997 Farrier et al.
5,595,577 A 1/1997 Bensalem et al.
5,596,706 A 1/1997 Sikk et al.
5,611,360 A 3/1997 Tang
5,613,504 A 3/1997 Collins et al.
5,613,505 A 3/1997 Campbell et al.
5,649,552 A 7/1997 Cho et al.
5,649,554 A 7/1997 Sprinkel et al.
5,659,656 A 8/1997 Das
5,665,262 A 9/1997 Hajaligol et al.
5,666,976 A 9/1997 Adams et al.
5,666,977 A 9/1997 Higgins et al.
5,666,978 A 9/1997 Counts et al.
5,692,525 A 12/1997 Counts et al.
5,692,526 A 12/1997 Adams et al.
5,703,633 A 12/1997 Gehrer et al.
5,708,258 A 1/1998 Counts et al.
5,711,320 A 1/1998 Martin
5,726,421 A 3/1998 Fleischhauer et al.
5,727,571 A 3/1998 Meiring et al.
5,730,158 A 3/1998 Collins et al.
5,750,964 A 5/1998 Counts et al.
5,799,663 A 9/1998 Gross et al.
5,816,263 A 10/1998 Counts et al.
5,819,756 A 10/1998 Mielordt
5,829,453 A 11/1998 White et al.
5,865,185 A 2/1999 Collins et al.
5,865,186 A 2/1999 Volsey, II
5,878,752 A 3/1999 Adams et al.
5,880,439 A 3/1999 Deevi et al.
5,894,841 A 4/1999 Voges
5,915,387 A 6/1999 Baggett, Jr. et al.
5,934,289 A 8/1999 Watkins et al.
5,954,979 A 9/1999 Counts et al.
5,967,148 A 10/1999 Harris et al.
6,026,820 A 2/2000 Baggett, Jr. et al.
6,033,623 A 3/2000 Deevi et al.
6,040,560 A 3/2000 Fleischhauer et al.
6,053,176 A 4/2000 Adams et al.
6,089,857 A 7/2000 Matsuura et al.
6,095,153 A 8/2000 Kessler et al.
6,116,247 A 9/2000 Banyasz et al.
6,119,700 A 9/2000 Fleischhauer et al.
6,125,853 A 10/2000 Susa et al.
6,125,855 A 10/2000 Nevett et al.
6,125,866 A 10/2000 Nichols et al.
6,155,268 A 12/2000 Takeuchi
6,164,287 A 12/2000 White
6,182,670 B1 2/2001 White
6,196,218 B1 3/2001 Voges
6,216,706 B1 4/2001 Kumar et al.
6,289,898 B1 9/2001 Fournier et al.
6,349,729 B1 2/2002 Pham
6,357,671 B1 3/2002 Cewers
6,418,938 B1 7/2002 Fleischhauer et al.
6,446,426 B1 9/2002 Sweeney et al.
6,450,025 B1 9/2002 Wado et al.
6,532,965 B1 3/2003 Abhulimen et al.
6,598,607 B2 7/2003 Adiga et al.
6,601,776 B1 8/2003 Oljaca et al.
6,615,840 B1 9/2003 Fournier et al.
6,688,313 B2 2/2004 Wrenn et al.
6,701,936 B2 3/2004 Shafer et al.
6,715,494 B1 4/2004 McCoy
6,722,756 B2 4/2004 Choy et al.
6,730,832 B1 5/2004 Dominguez et al.
6,772,756 B2 8/2004 Shayan
6,803,545 B2 10/2004 Blake et al.
6,803,550 B2 10/2004 Sharpe et al.
6,810,883 B2 11/2004 Felter et al.
6,854,461 B2 2/2005 Nichols et al.
6,854,470 B1 2/2005 Pu
6,994,096 B2 2/2006 Rostami et al.
7,011,096 B2 3/2006 Li et al.
7,017,585 B2 3/2006 Li et al.
7,025,066 B2 4/2006 Lawson et al.
7,117,867 B2 10/2006 Cox et al.
7,131,599 B2 11/2006 Katase
7,163,015 B2 1/2007 Moffitt
7,173,322 B2 2/2007 Cox et al.
7,185,659 B2 3/2007 Sharpe et al.
7,234,470 B2 6/2007 Yang
7,290,549 B2 11/2007 Banerjee et al.
7,293,565 B2 11/2007 Griffin et al.
7,392,809 B2 7/2008 Larson et al.
7,513,253 B2 4/2009 Kobayashi et al.
7,647,932 B2 1/2010 Cantrell et al.
7,690,385 B2 4/2010 Moffitt
7,692,123 B2 4/2010 Baba et al.
7,726,320 B2 6/2010 Robinson et al.
7,810,505 B2 10/2010 Yang
7,832,410 B2 11/2010 Hon
7,878,209 B2 2/2011 Newbery et al.
7,896,006 B2 3/2011 Hamano et al.
8,066,010 B2 11/2011 Newbery et al.
8,079,371 B2 12/2011 Robinson et al.
8,499,766 B1 8/2013 Newton
8,528,569 B1 9/2013 Newton
2002/0073995 A1 6/2002 Rubin
2002/0146242 A1 10/2002 Vieira
2003/0106551 A1 6/2003 Sprinkel
2003/0116559 A1 6/2003 Park
2003/0131859 A1 7/2003 Li et al.
2003/0209245 A1 11/2003 Poole et al.
2003/0226837 A1 12/2003 Blake et al.
2004/0020500 A1 2/2004 Wrenn et al.
2004/0129280 A1 7/2004 Woodson et al.
2004/0149296 A1 8/2004 Rostami et al.
2004/0163641 A1 8/2004 Tyvoll
2004/0200488 A1 10/2004 Felter et al.
2004/0224435 A1 11/2004 Shibata et al.
2004/0226568 A1 11/2004 Takeuchi et al.
2004/0255965 A1 12/2004 Perfetti et al.
2005/0016549 A1 1/2005 Banerjee et al.
2005/0016550 A1 1/2005 Katase
2005/0034723 A1 2/2005 Bennett et al.
2005/0066986 A1 3/2005 Nestor et al.
2005/0067503 A1 3/2005 Katase
2005/0150489 A1 7/2005 Dunfield et al.
2005/0151126 A1 7/2005 Yamakawa et al.
2005/0172956 A1 8/2005 Childers
2005/0172976 A1 8/2005 Newman et al.
2005/0274390 A1 12/2005 Banerjee et al.
2006/0016453 A1 1/2006 Kim
2006/0016550 A1 1/2006 Connors, Jr. et al.
2006/0032501 A1 2/2006 Hale et al.
2006/0070633 A1 4/2006 Rostami et al.
2006/0162733 A1 7/2006 McGrath et al.
2006/0185687 A1 8/2006 Hearn et al.
2006/0196518 A1 9/2006 Hon
2007/0074734 A1 4/2007 Braunshteyn et al.
2007/0102013 A1 5/2007 Adams et al.
2007/0215167 A1 9/2007 Crooks et al.
2007/0257022 A1 11/2007 Lin et al.
2007/0283972 A1 12/2007 Monsees et al.
2008/0083744 A1* 4/2008 Ruiz ..................... H05B 3/265
219/541
2008/0092912 A1 4/2008 Robinson et al.
2008/0149118 A1 6/2008 Oglesby et al.
2008/0226269 A1 9/2008 DeWitt et al.
2008/0245377 A1 10/2008 Marshall et al.
2008/0257367 A1 10/2008 Paterno et al.
2008/0276947 A1 11/2008 Martzel
2008/0302374 A1 12/2008 Wengert et al.
2009/0065010 A1 3/2009 Shands
2009/0095311 A1 4/2009 Hon
2009/0095312 A1 4/2009 Herbrich et al.
2009/0126745 A1 5/2009 Hon
2009/0133691 A1 5/2009 Yamada et al.
2009/0151717 A1 6/2009 Bowen et al.
2009/0188490 A1 7/2009 Han
2009/0230117 A1 9/2009 Fernando et al.
2009/0260641 A1 10/2009 Monsees et al.

(56) References Cited

U.S. PATENT DOCUMENTS

| | | | |
|---|---|---|---|
| 2009/0260642 A1 | 10/2009 | Monsees et al. | |
| 2009/0272379 A1 | 11/2009 | Thorens et al. | |
| 2009/0283103 A1 | 11/2009 | Nielsen et al. | |
| 2009/0293892 A1 | 12/2009 | Williams et al. | |
| 2009/0320863 A1 | 12/2009 | Fernando et al. | |
| 2009/0324206 A1 | 12/2009 | Young et al. | |
| 2010/0006113 A1 | 1/2010 | Urtsev et al. | |
| 2010/0024834 A1 | 2/2010 | Oglesby et al. | |
| 2010/0043809 A1 | 2/2010 | Magnon | |
| 2010/0059070 A1 | 3/2010 | Potter et al. | |
| 2010/0059073 A1 | 3/2010 | Hoffmann et al. | |
| 2010/0065075 A1 | 3/2010 | Banerjee et al. | |
| 2010/0083959 A1 | 4/2010 | Siller | |
| 2010/0163063 A1 | 7/2010 | Fernando et al. | |
| 2010/0200006 A1 | 8/2010 | Robinson et al. | |
| 2010/0229881 A1 | 9/2010 | Hearn | |
| 2010/0242974 A1 | 9/2010 | Pan | |
| 2010/0242976 A1 | 9/2010 | Katayama et al. | |
| 2010/0258139 A1 | 10/2010 | Onishi et al. | |
| 2010/0300467 A1 | 12/2010 | Kuistilla et al. | |
| 2010/0307518 A1 | 12/2010 | Wang | |
| 2010/0313901 A1 | 12/2010 | Fernando et al. | |
| 2011/0005535 A1 | 1/2011 | Xiu | |
| 2011/0011396 A1 | 1/2011 | Fang | |
| 2011/0036346 A1 | 2/2011 | Cohen et al. | |
| 2011/0036363 A1 | 2/2011 | Urtsev et al. | |
| 2011/0036365 A1 | 2/2011 | Chong et al. | |
| 2011/0073121 A1 | 3/2011 | Levin et al. | |
| 2011/0088707 A1 | 4/2011 | Hajaligol | |
| 2011/0094523 A1 | 4/2011 | Thorens et al. | |
| 2011/0104587 A1 | 5/2011 | Poshusta | |
| 2011/0120480 A1 | 5/2011 | Brenneise | |
| 2011/0126847 A1 | 6/2011 | Zuber et al. | |
| 2011/0126848 A1 | 6/2011 | Zuber et al. | |
| 2011/0155153 A1 | 6/2011 | Thorens et al. | |
| 2011/0155718 A1 | 6/2011 | Greim et al. | |
| 2011/0162663 A1 | 7/2011 | Bryman | |
| 2011/0168194 A1 | 7/2011 | Hon | |
| 2011/0180082 A1 | 7/2011 | Banerjee et al. | |
| 2011/0265806 A1* | 11/2011 | Alarcon | A24F 40/90 131/273 |
| 2011/0277780 A1 | 11/2011 | Terry et al. | |
| 2011/0309157 A1 | 12/2011 | Yang et al. | |
| 2012/0042885 A1 | 2/2012 | Stone et al. | |
| 2012/0060853 A1 | 3/2012 | Robinson et al. | |
| 2012/0085343 A1* | 4/2012 | Cortez | A61M 16/0816 128/200.14 |
| 2012/0111347 A1 | 5/2012 | Hon | |
| 2012/0132643 A1 | 5/2012 | Choi et al. | |
| 2012/0167906 A1 | 7/2012 | Gysland | |
| 2012/0199146 A1 | 8/2012 | Marangos | |
| 2012/0199572 A1 | 8/2012 | Shen et al. | |
| 2012/0199663 A1 | 8/2012 | Qiu | |
| 2012/0227753 A1 | 9/2012 | Newton | |
| 2012/0231464 A1 | 9/2012 | Yu et al. | |
| 2012/0260926 A1 | 10/2012 | Tu et al. | |
| 2012/0279512 A1 | 11/2012 | Hon | |
| 2012/0318882 A1 | 12/2012 | Abehasera | |
| 2013/0042865 A1 | 2/2013 | Monsees et al. | |
| 2013/0056888 A1 | 3/2013 | Holakovsky et al. | |
| 2013/0081623 A1 | 4/2013 | Buchberger | |
| 2013/0081642 A1 | 4/2013 | Safari | |
| 2013/0192616 A1 | 8/2013 | Tucker et al. | |
| 2013/0192622 A1 | 8/2013 | Tucker et al. | |
| 2013/0199528 A1* | 8/2013 | Goodman | A61M 15/0091 392/394 |
| 2013/0213419 A1 | 8/2013 | Tucker et al. | |
| 2013/0220315 A1 | 8/2013 | Conley et al. | |
| 2013/0228190 A1 | 9/2013 | Weiss et al. | |
| 2013/0228191 A1 | 9/2013 | Newton | |
| 2013/0233313 A1 | 9/2013 | Young et al. | |
| 2013/0247924 A1 | 9/2013 | Scatterday et al. | |
| 2013/0253427 A1 | 9/2013 | Cerman et al. | |
| 2013/0276799 A1 | 10/2013 | Davidson et al. | |
| 2013/0284194 A1 | 10/2013 | Newton | |
| 2013/0298905 A1 | 11/2013 | Levin et al. | |
| 2013/0306064 A1 | 11/2013 | Thorens et al. | |
| 2013/0306084 A1 | 11/2013 | Flick | |
| 2013/0312742 A1 | 11/2013 | Monsees et al. | |
| 2013/0312776 A1 | 11/2013 | Newton | |
| 2013/0319435 A1 | 12/2013 | Flick | |
| 2013/0319438 A1 | 12/2013 | Liu | |
| 2013/0340775 A1 | 12/2013 | Juster et al. | |
| 2014/0060552 A1 | 3/2014 | Cohen | |
| 2014/0060554 A1 | 3/2014 | Collett et al. | |
| 2014/0076310 A1 | 3/2014 | Newton | |
| 2014/0345631 A1 | 11/2014 | Bowen et al. | |
| 2014/0366898 A1 | 12/2014 | Monsees et al. | |
| 2015/0020824 A1 | 1/2015 | Bowen et al. | |
| 2015/0128971 A1 | 5/2015 | Verleur et al. | |
| 2015/0208729 A1 | 7/2015 | Monsees et al. | |

FOREIGN PATENT DOCUMENTS

| | | | |
|---|---|---|---|
| CA | 2 752 255 | | 8/2010 |
| CN | 1541577 | | 11/2004 |
| CN | 2719043 | | 8/2005 |
| CN | 200997909 | | 1/2008 |
| CN | 101116542 | | 2/2008 |
| CN | 101176805 | | 5/2008 |
| CN | 201379072 | | 1/2010 |
| CN | 203152491 | U | 8/2013 |
| DE | 10 2006 004 484 | | 8/2007 |
| DE | 102006041042 | | 3/2008 |
| DE | 20 2009 010 400 | | 11/2009 |
| DE | 20 2013 100 606 | U1 | 4/2013 |
| EP | 0 295 122 | | 12/1988 |
| EP | 0 430 566 | | 6/1991 |
| EP | 0 532 194 | | 3/1993 |
| EP | 0 845 220 | | 6/1998 |
| EP | 1 618 803 | | 1/2006 |
| EP | 2 316 286 | | 5/2011 |
| EP | 2 468 116 | | 6/2012 |
| GB | 1444461 | | 7/1976 |
| GB | 2469850 | | 11/2010 |
| JP | 2000245430 | | 9/2000 |
| JP | 2007-207672 | | 8/2007 |
| JP | 2007-222990 | | 9/2007 |
| JP | 2009053797 | | 3/2009 |
| JP | 2011087569 | | 5/2011 |
| JP | 2012249854 | A | 12/2012 |
| KR | 1020050037919 | A | 4/2005 |
| KR | 20-2010-0007300 | | 7/2010 |
| KR | 10-2012-0080284 | | 7/2012 |
| KR | 10-2012-0105655 | | 9/2012 |
| KR | 20-2012-0006582 | | 9/2012 |
| RU | 94815 | | 6/2010 |
| RU | 115629 | | 5/2012 |
| WO | WO 1986/02528 | | 5/1986 |
| WO | WO 1997/48293 | | 12/1997 |
| WO | WO 02/37990 | | 5/2002 |
| WO | WO 2004/043175 | | 5/2004 |
| WO | WO 2007/131449 | | 11/2007 |
| WO | WO 2008/108889 | | 9/2008 |
| WO | WO 2009/105919 | | 9/2009 |
| WO | WO 2009/155734 | | 12/2009 |
| WO | WO 2010/003480 | | 1/2010 |
| WO | WO 2010/045670 | | 4/2010 |
| WO | WO 2010/073122 | | 7/2010 |
| WO | WO 2010/091593 | | 8/2010 |
| WO | WO 2010/118644 | | 10/2010 |
| WO | WO 2010/140937 | | 12/2010 |
| WO | WO 2011/010334 | | 1/2011 |
| WO | WO 2011/081558 | | 7/2011 |
| WO | WO 2013/013808 | | 1/2013 |
| WO | WO 2013/022936 | | 2/2013 |
| WO | WO 2013/098395 | | 7/2013 |

* cited by examiner

ELECTRONIC SMOKING ARTICLE COMPRISING ONE OR MORE MICROHEATERS

CROSS-REFERENCE TO RELATED APPLICATIONS

The present application is a continuation of U.S. patent application Ser. No. 17/327,388, filed May 21, 2021, which is a continuation of U.S. patent application Ser. No. 16/722,794, filed Dec. 20, 2019, now U.S. Pat. No. 11,044,950, which is a continuation of U.S. patent application Ser. No. 15/982,411, filed May 17, 2018, now abandoned, which is a continuation of U.S. patent application Ser. No. 14/512,561, filed Oct. 13, 2014, now U.S. Pat. No. 9,980,512, which is a continuation of U.S. patent application Ser. No. 13/602,871, filed Sep. 4, 2012, now U.S. Pat. No. 8,881,737, the disclosures of which are incorporated herein by reference in their entirety.

FIELD OF THE INVENTION

The present invention relates to aerosol delivery articles and uses thereof for yielding tobacco components or other materials in an inhalable form. The articles may be made or derived from tobacco or otherwise incorporate tobacco for human consumption.

BACKGROUND OF THE INVENTION

Many smoking articles have been proposed through the years as improvements upon, or alternatives to, smoking products based upon combusting tobacco. Exemplary alternatives have included devices wherein a solid or liquid fuel is combusted to transfer heat to tobacco or wherein a chemical reaction is used to provide such heat source. Numerous references have proposed various smoking articles of a type that generate flavored vapor, visible aerosol, or a mixture of flavored vapor and visible aerosol. Some of those proposed types of smoking articles include tubular sections or longitudinally extending air passageways.

The point of the improvements or alternatives to smoking articles typically has been to provide the sensations associated with cigarette, cigar, or pipe smoking, without delivering considerable quantities of incomplete combustion and pyrolysis products. To this end, there have been proposed numerous smoking products, flavor generators, and medicinal inhalers which utilize electrical energy to vaporize or heat a volatile material, or attempt to provide the sensations of cigarette, cigar, or pipe smoking without burning tobacco.

General examples of alternative smoking articles are described in U.S. Pat. No. 3,258,015 to Ellis et al.; U.S. Pat. No. 3,356,094 to Ellis et al.; U.S. Pat. No. 3,516,417 to Moses; U.S. Pat. No. 4,347,855 to Lanzellotti et al.; U.S. Pat. No. 4,340,072 to Bolt et al.; U.S. Pat. No. 4,391,285 to Burnett et al.; U.S. Pat. No. 4,917,121 to Riehl et al.; U.S. Pat. No. 4,924,886 to Litzinger; and U.S. Pat. No. 5,060,676 to Hearn et al. Many of those types of smoking articles have employed a combustible fuel source that is burned to provide an aerosol and/or to heat an aerosol-forming material. See, for example, the background art cited in U.S. Pat. No. 4,714,082 to Banerjee et al. and U.S. Pat. No. 4,771,795 to White et al.; which are incorporated herein by reference in their entireties. See, also, for example, those types of smoking articles described in U.S. Pat. No. 4,756,318 to Clearman et al.; U.S. Pat. No. 4,714,082 to Banerjee et al.; U.S. Pat. No. 4,771,795 to White et al.; U.S. Pat. No. 4,793,365 to Sensabaugh et al.; U.S. Pat. No. 4,917,128 to Clearman et al.; U.S. Pat. No. 4,961,438 to Korte; U.S. Pat. No. 4,966,171 to Serrano et al.; U.S. Pat. No. 4,969,476 to Bale et al.; U.S. Pat. No. 4,991,606 to Serrano et al.; U.S. Pat. No. 5,020,548 to Farrier et al.; U.S. Pat. No. 5,033,483 to Clearman et al.; U.S. Pat. No. 5,040,551 to Schlatter et al.; U.S. Pat. No. 5,050,621 to Creighton et al.; U.S. Pat. No. 5,065,776 to Lawson; U.S. Pat. No. 5,076,296 to Nystrom et al.; U.S. Pat. No. 5,076,297 to Farrier et al.; U.S. Pat. No. 5,099,861 to Clearman et al.; U.S. Pat. No. 5,105,835 to Drewett et al.; U.S. Pat. No. 5,105,837 to Barnes et al.; U.S. Pat. No. 5,115,820 to Hauser et al.; U.S. Pat. No. 5,148,821 to Best et al.; U.S. Pat. No. 5,159,940 to Hayward et al.; U.S. Pat. No. 5,178,167 to Riggs et al.; U.S. Pat. No. 5,183,062 to Clearman et al.; U.S. Pat. No. 5,211,684 to Shannon et al.; U.S. Pat. No. 5,240,014 to Deevi et al.; U.S. Pat. No. 5,240,016 to Nichols et al.; U.S. Pat. No. 5,345,955 to Clearman et al.; U.S. Pat. No. 5,551,451 to Riggs et al.; U.S. Pat. No. 5,595,577 to Bensalem et al.; U.S. Pat. No. 5,819,751 to Barnes et al.; U.S. Pat. No. 6,089,857 to Matsuura et al.; U.S. Pat. No. 6,095,152 to Beven et al; U.S. Pat. No. 6,578,584 Beven; and U.S. Pat. No. 6,730,832 to Dominguez; which are incorporated herein by reference in their entireties. Furthermore, certain types of cigarettes that employ carbonaceous fuel elements have been commercially marketed under the brand names "Premier" and "Eclipse" by R. J. Reynolds Tobacco Company. See, for example, those types of cigarettes described in Chemical and Biological Studies on New Cigarette Prototypes that Heat Instead of Burn Tobacco, R. J. Reynolds Tobacco Company Monograph (1988) and Inhalation Toxicology, 12:5, p. 1-58 (2000). See also US Pat. Pub. No. 2005/0274390 to Banerjee et al., US Pat. Pub. No. 2007/0215167 to Crooks et al., US Pat. Pub. No. 2010/0065075 to Banerjee et al., and US Pat. Pub. No. 2012/0042885 to Stone et al., the disclosures of which are incorporated herein by reference in their entireties.

Certain proposed cigarette-shaped tobacco products purportedly employ tobacco in a form that is not intended to be burned to any significant degree. See, for example, U.S. Pat. No. 4,836,225 to Sudoh; U.S. Pat. No. 4,972,855 to Kuriyama et al.; and U.S. Pat. No. 5,293,883 to Edwards, which are incorporated herein by reference in their entireties. Yet other types of smoking articles, such as those types of smoking articles that generate flavored vapors by subjecting tobacco or processed tobaccos to heat produced from chemical or electrical heat sources, are described in U.S. Pat. No. 4,848,374 to Chard et al.; U.S. Pat. Nos. 4,947,874 and 4,947,875 to Brooks et al.; U.S. Pat. No. 5,060,671 to Counts et al.; U.S. Pat. No. 5,146,934 to Deevi et al.; U.S. Pat. No. 5,224,498 to Deevi; U.S. Pat. No. 5,285,798 to Banerjee et al.; U.S. Pat. No. 5,357,984 to Farrier et al.; U.S. Pat. No. 5,593,792 to Farrier et al.; U.S. Pat. No. 5,369,723 to Counts; U.S. Pat. No. 5,692,525 to Counts et al.; U.S. Pat. No. 5,865,185 to Collins et al.; U.S. Pat. No. 5,878,752 to Adams et al.; U.S. Pat. No. 5,880,439 to Deevi et al.; U.S. Pat. No. 5,915,387 to Baggett et al.; U.S. Pat. No. 5,934,289 to Watkins et al.; U.S. Pat. No. 6,033,623 to Deevi et al.; U.S. Pat. No. 6,053,176 to Adams et al.; U.S. Pat. No. 6,164,287 to White; U.S. Pat. No. 6,289,898 to Fournier et al.; U.S. Pat. No. 6,615,840 to Fournier et al.; U.S. Pat. Pub. No. 2003/0131859 to Li et al.; U.S. Pat. Pub. No. 2005/0016549 to Banerjee et al.; and U.S. Pat. Pub. No. 2006/0185687 to Hearn et al., each of which is incorporated herein by reference in its entirety.

Certain attempts have been made to deliver vapors, sprays or aerosols, such as those possessing or incorporating flavors and/or nicotine. See, for example, the types of devices set forth in U.S. Pat. No. 4,190,046 to Virag; U.S. Pat. No. 4,284,089 to Ray; U.S. Pat. No. 4,635,651 to Jacobs; U.S. Pat. No. 4,735,217 to Gerth et al.; U.S. Pat. No. 4,800,903 to Ray et al.; U.S. Pat. No. 5,388,574 to Ingebrethsen et al.; U.S. Pat. No. 5,799,663 to Gross et al.; U.S. Pat. No. 6,532,965 to Abhulimen et al.; and U.S. Pat. No. 6,598,607 to Adiga et al; and EP 1,618,803 to Hon; which are incorporated herein by reference in their entireties. See also, U.S. Pat. No. 7,117,867 to Cox et al. and the devices set forth on the website, www.e-cig.com, which are incorporated herein by reference in their entireties.

Still further representative cigarettes or smoking articles that have been described and, in some instances, been made commercially available include those described in U.S. Pat. No. 4,922,901 to Brooks et al.; U.S. Pat. No. 5,249,586 to Morgan et al.; U.S. Pat. No. 5,388,594 to Counts et al.; U.S. Pat. No. 5,666,977 to Higgins et al.; U.S. Pat. No. 6,196,218 to Voges; U.S. Pat. No. 6,810,883 to Felter et al.; U.S. Pat. No. 6,854,461 to Nichols; U.S. Pat. No. 7,832,410 to Hon; U.S. Pat. No. 7,513,253 to Kobayashi; U.S. Pat. No. 7,726,320 to Robinson et al.; U.S. Pat. No. 7,896,006 to Hamano; U.S. Pat. No. 6,772,756 to Shayan; US Pat. Pub. No. 2009/0095311 to Hon; US Pat. Pub. Nos. 2006/0196518, 2009/0126745, and 2009/0188490 to Hon; US Pat. Pub. No. 2009/0272379 to Thorens et al.; US Pat. Pub. Nos. 2009/0260641 and 2009/0260642 to Monsees et al.; US Pat. Pub. Nos. 2008/0149118 and 2010/0024834 to Oglesby et al.; US Pat. Pub. No. 2010/0307518 to Wang; and WO 2010/091593 to Hon. See also U.S. Pat. No. D657,047 to Minskoff et al. and US Pat. Pub. Nos. 2011/0277757, 2011/0277760, and US 2011/0277764 to Terry et al. Still further examples include electronic cigarette products commercially available under the names ACCORD®; HEATBAR™; HYBRID CIGARETTE®, VEGAS™; E-GAR™; C-GAR™; E-MY-STICK™; IOLITE® Vaporizer, GREEN SMOKE®, BLU™ Cigs, WHITE CLOUD® Cirrus, V2CIGS™, SOUTH BEACH SMOKE™, SMOKETIP®, SMOKE STIK®, NJOY®, LUCI®, Royal Blues, SMART SMOKER®, SMOKE ASSIST®, Knight Sticks, GAMUCCI®, InnoVapor, SMOKING EVERYWHERE®, Crown 7, CHOICE™ NO. 7™, VAPORKING®, EPUFFER®, LOGIC™ ecig, VAPOR4LIFE®, NICOTEK®, METRO®, VUSE®, and PREMIUM™.

Smoking articles that employ tobacco substitute materials and smoking articles that employ sources of heat other than burning tobacco cut filler to produce tobacco-flavored vapors or tobacco-flavored visible aerosols have not received widespread commercial success. Articles that produce the taste and sensation of smoking by electrically heating tobacco particularly have suffered from inconsistent release of flavors or other inhalable materials. Electrically heated smoking devices have further been limited in many instances to the requirement of an external heating device that was inconvenient and that detracted from the smoking experience. Accordingly, it can be desirable to provide a smoking article that can provide the sensations of cigarette, cigar, or pipe smoking, that does so without significantly combusting tobacco, that does so without the need of a combustion heat source, and that does so without necessarily delivering considerable quantities of incomplete combustion and pyrolysis products.

BRIEF SUMMARY OF THE INVENTION

The present invention provides a smoking article and methods of use thereof for controllably delivering aerosol precursor components. In particular, disclosed herein is an article that incorporates one or more microheaters for use in vaporizing or aerosolizing a composition to provide a desired result to a consumer of the article. Such result can be to achieve an experience substantially similar to the smoking of a conventional cigarette or to achieve delivery of a flavor or the like.

In various embodiments, a smoking article according to the present disclosure can comprise an electrical power source and a microheater in electrical connection with the electrical power source. More specifically, the microheater can be characterized as a Micro-Electro-Mechanical Systems (MEMS) based heater. The microheater alternatively can be characterized as being a thin film heater.

The nature of a microheater useful according to the present disclosure can vary. In various embodiments, the microheater can comprise a patterned, electrically conductive material. For example, the electrically conductive material can be selected from the group consisting of elemental metals, metal alloys, silicon, carbon, carbides, nitrides, and combinations thereof. The microheater can comprise a supporting layer upon which the electrically conductive material is patterned. For instance, the electrically conductive material can be a printed layer overlying the supporting layer. Alternatively, the electrically conductive material can be an etched layer overlying the supporting layer. Preferably, the supporting layer is temperature stable in a defined temperature range, such as a temperature range of about 125° C. to about 750° C. In certain embodiments, a supporting layer can comprise a silicon-based material, such as silicon nitride. The microheater can comprise a protective layer overlying the patterned, electrically conductive material. Preferably, the protective layer is temperature stable in a defined temperature range, such as a range of about 125° C. to about 750° C. In certain embodiments, the protective layer can comprise a silicon-based material, such as silicon dioxide. As can be seen from the foregoing, a microheater useful in the presently disclosed articles can comprise two or more layers. For example, the microheater can be characterized as comprising an electrically conductive material sandwiched between two layers or two membranes. A microheater as disclosed herein also can have defined dimensions. For example, the microheater can have a length of up to about 3 mm and a width of up to about 3 mm. More particularly, the microheater can have a length of about 0.5 mm to about 3 mm and a width of about 0.5 mm to about 3 mm.

A microheater for use in an article as disclosed herein can be utilized independent of further components. In other embodiments, the microheater can be attached to a substrate. Such substrate can be a permanent fixture of the article, or the substrate can be removable from the smoking article. Preferably, the substrate can be formed of an electrically insulating material.

In particular embodiments, a smoking article according to the present disclosure can comprise a plurality of microheaters. If desired, the plurality of microheaters can be serially aligned within the smoking article. As such, the serially aligned microheaters can be adapted to heat in a defined order (e.g., sequentially) or pattern (e.g., two or more microheaters separately heated out of sequence or two or more microheaters simultaneously heated).

A smoking article as disclosed herein further can comprise an aerosol precursor composition. In specific embodiments, the microheater can be operatively positioned within the smoking article to be substantially in contact with the aerosol precursor composition. Further, the aerosol precursor composition can be present in a variety of forms, such as being in the form of a liquid or gel at ambient conditions. If desired, the aerosol precursor composition alternatively can be in the form of a solid at ambient conditions. In specific embodiments, the aerosol precursor composition can be in the form of a gel that is coated on the microheater.

In other embodiments, the aerosol precursor composition can be provided in a reservoir such that the aerosol precursor composition is separated from the microheater. Accordingly, the article can comprise a controller adapted to actuate delivery of a defined volume of the aerosol precursor composition to the microheater. In specific embodiments, the microheater can be in thermal connection with a chamber formed of a wall, the chamber being adapted to receive an aliquot of the aerosol precursor composition through an opening in the chamber. The chamber can include an opening adapted for the exit of vapor from the chamber and/or can include an opening adapted for infiltration of air. In certain embodiments, the chamber can have a volume of about 0.2 ml to about 1 ml. Such embodiments can be adapted for separate heating of separate compositions or components thereof. For example, the aerosol precursor composition can comprise a plurality of separate components, the smoking article can comprise a plurality of reservoirs separately containing the separate components of the aerosol precursor composition, and the smoking article can comprise a plurality of chambers adapted to receive aliquots of the separate components of the aerosol precursor composition from the reservoirs.

In still further embodiments, the aerosol precursor composition can be coated on, adsorbed by, or absorbed in a carrier material. Further, the carrier material can be positioned within the article to be in substantial contact with the microheater. If desired, the article can comprise a plurality of microheaters that are in substantial contact with the carrier material.

The aerosol precursor composition can include a variety of components. For example, the composition can comprise one or more of a polyhydric alcohol, a medicament, a tobacco-derived material, and a flavorant.

The electrical power source can be selected from the group consisting of a battery, a capacitor, and combinations thereof. Moreover, the article can comprise a control component that actuates current flow from the electrical power source to the microheater. For example, the control component can comprise a puff-actuated sensor or a capacitive sensor.

In further embodiments, the smoking article can be characterized in relation to an atomizer used therein. For example, the smoking article can include a microheater that is integral with an atomizer. More specifically, the atomizer can comprise a chamber defined by a wall, a cover, and a protective layer overlying the microheater. Moreover, one or both of the wall and the cover can include a plurality of openings sized such that vapor passes therethrough but such that liquid does not pass therethrough.

The present disclosure thus also can encompass an atomizer that is suitable for use in an electronic smoking article. For example, the atomizer can comprise a chamber formed of a chamber wall, a cover, and a microheater. The chamber wall and the cover can be monolithic and can be attached to a supporting layer or a protective layer of a microheater as discussed herein. One or both of the chamber wall and the cover can include a plurality of openings sized such that vapor passes therethrough but such that liquid does not pass therethrough.

In further embodiments, the present disclosure can relate to a method of forming an aerosol in a smoking article. For instance, the method can comprise initiating current flow from an electrical power source within a smoking article to a microheater within the smoking article so as to cause heating of the microheater and an aerosol precursor composition contacting the microheater.

In specific embodiments, the smoking article utilized in the method can comprise a plurality of microheaters, and two or more of the microheaters can be simultaneously heated. Moreover, the aerosol precursor composition can comprise two or more separate components, and the separate components of the aerosol precursor composition can be separately heated by the microheaters. Further, the microheaters can receive current flow from the electrical power source under different conditions such that the microheaters are heated to different temperatures or are heated for different amounts of time. In some embodiments, two or more of the microheaters can be heated serially.

As desired, the aerosol precursor composition can be coated on, adsorbed by, or absorbed in a carrier material. Moreover, prior to the step of initiating current flow, the method further can comprise inserting the carrier material into the smoking article. In further embodiments, the microheater(s) can be attached to a substrate. Similarly, prior to the step of initiating current flow, the method further can comprise inserting the substrate into the smoking article. Beneficially, the aerosol precursor composition can be coated on the microheater(s) attached to the substrate. In yet further embodiments, the method can comprise initiating flow of the aerosol precursor composition from a reservoir to a chamber that is in thermal connection with the microheater so as to heat the aerosol precursor composition within the chamber.

BRIEF DESCRIPTION OF THE FIGURES

Figure 1:
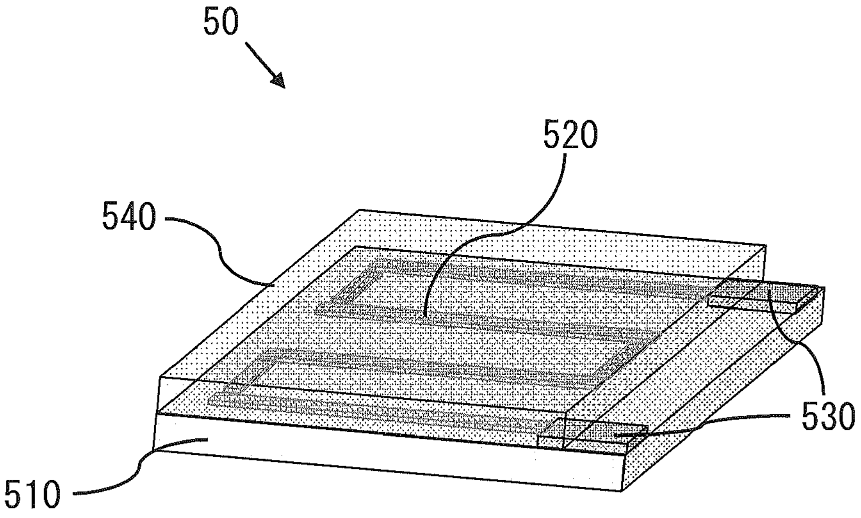
Figure 2:
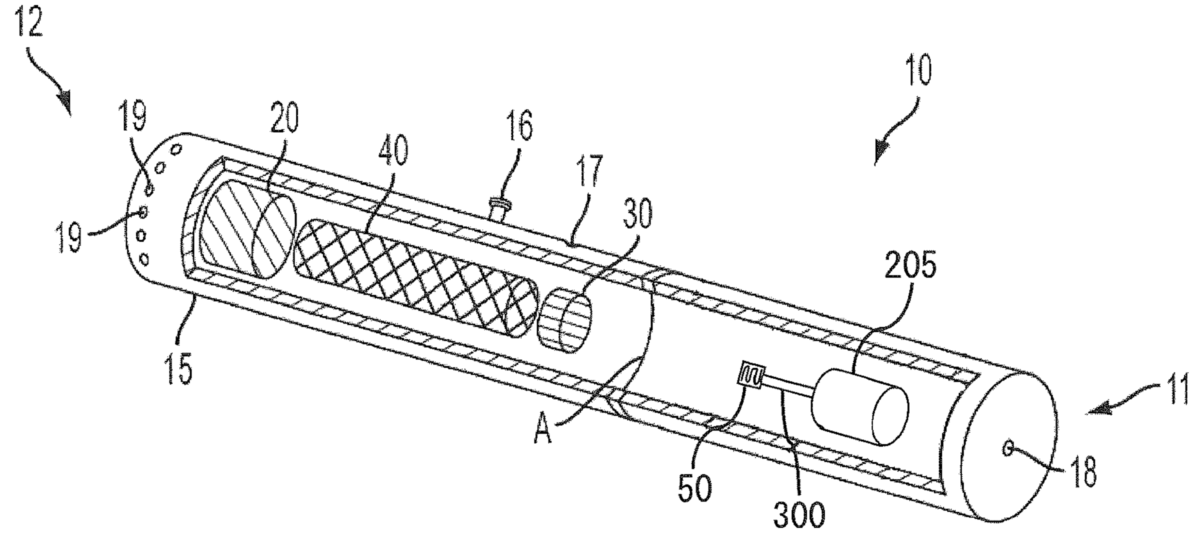
Figure 3:
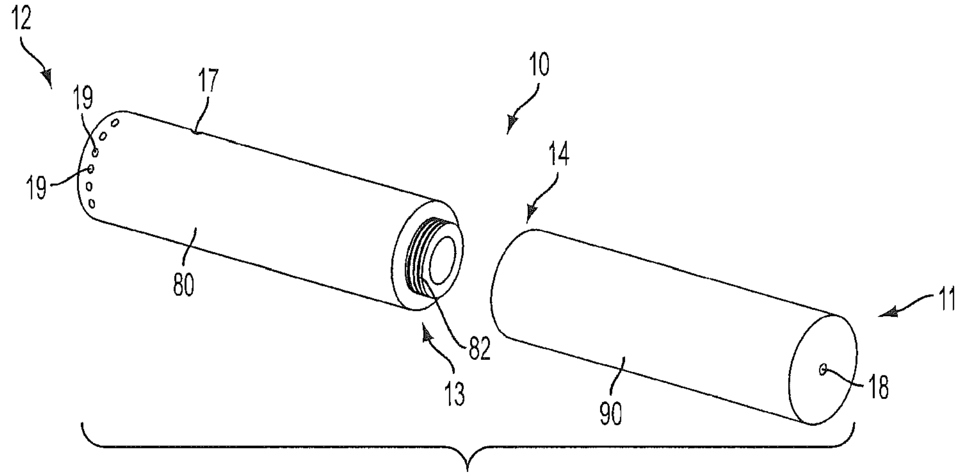
Figure 4:
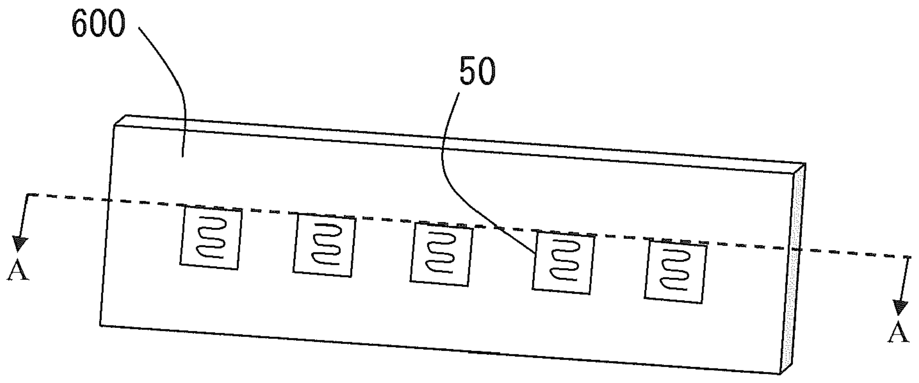
Figure 5:
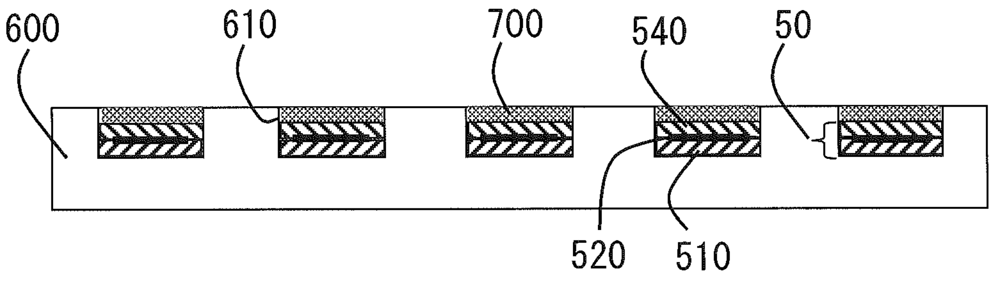
Figure 6:
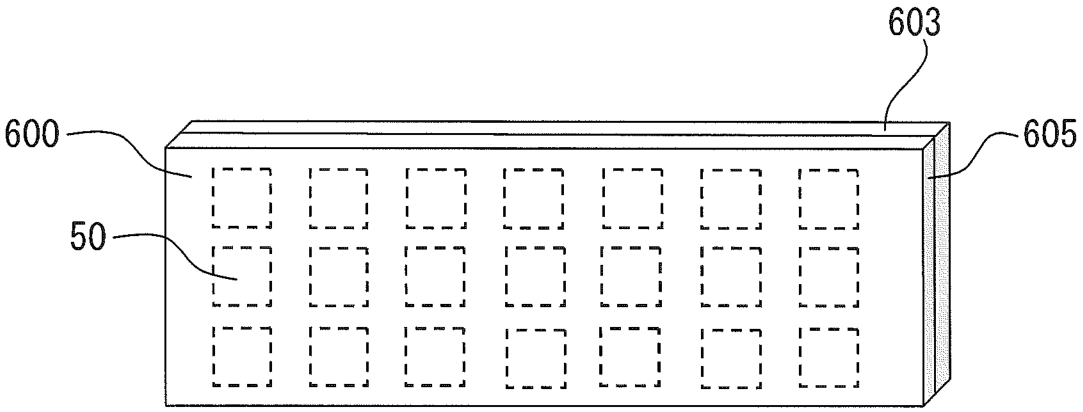
Figure 7:
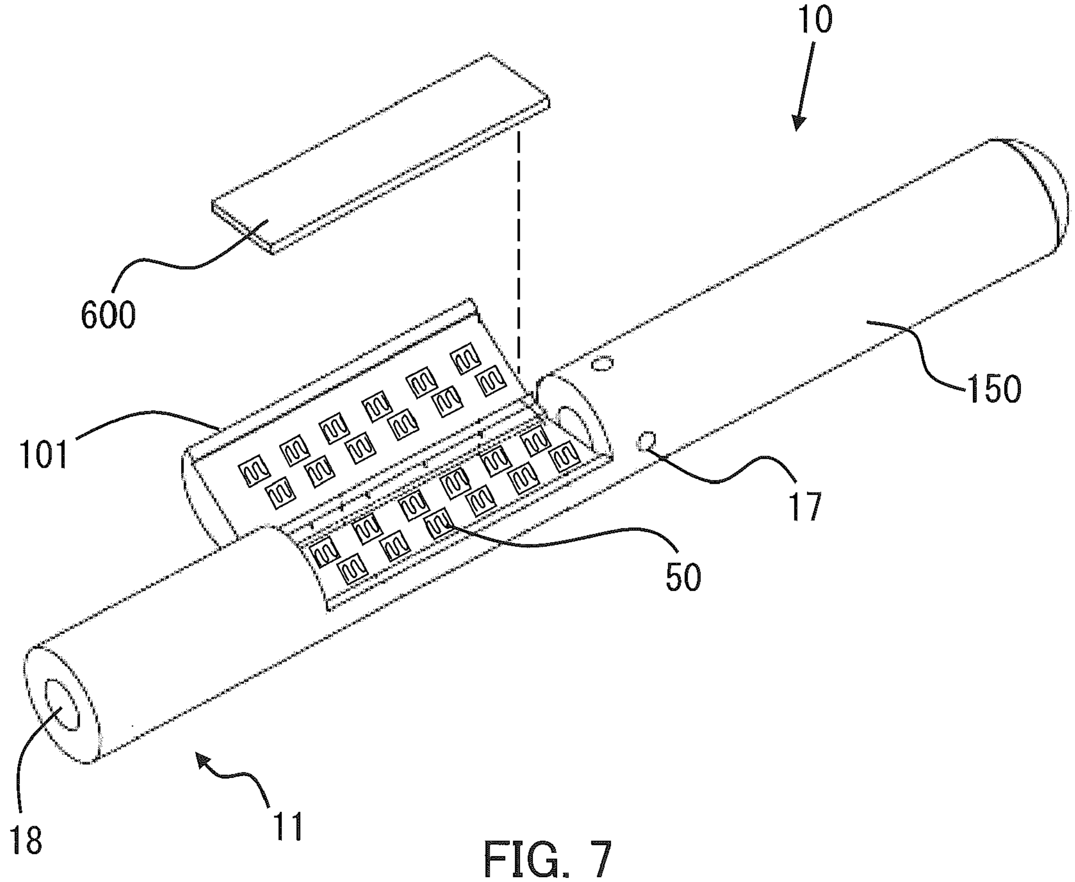
Figure 8:
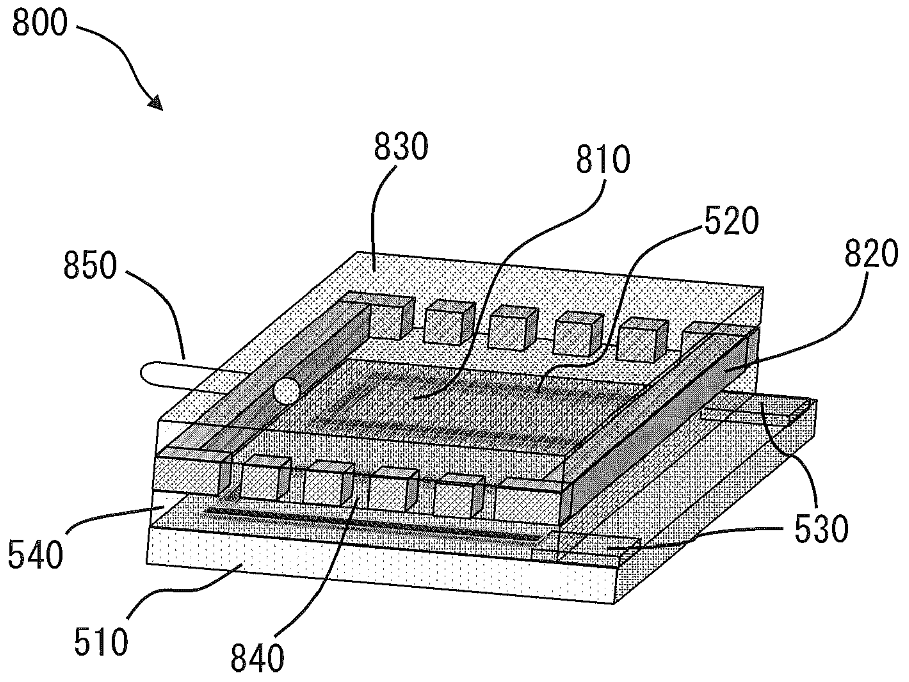
Figure 9:
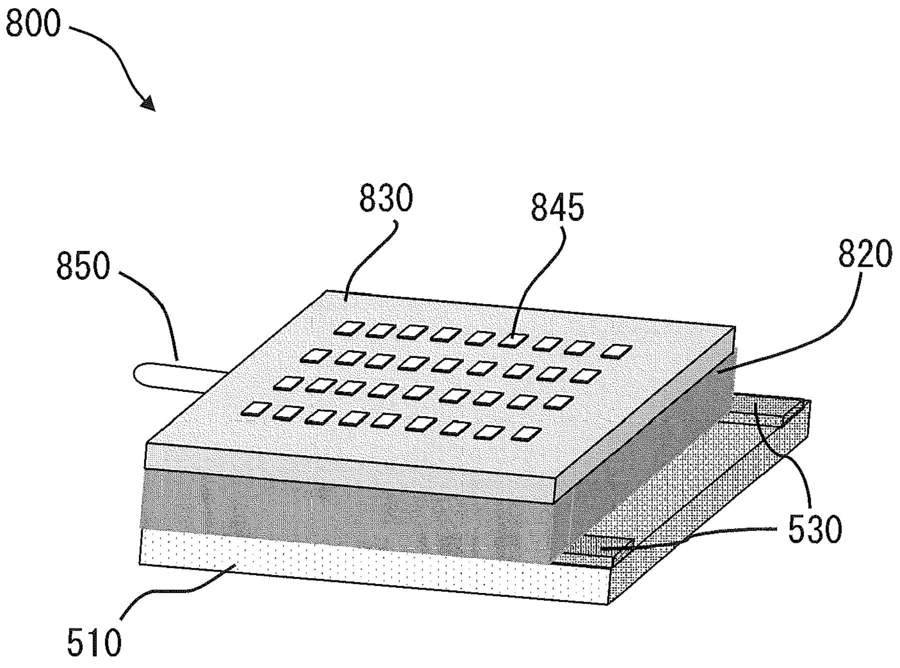

Having thus described the invention in the foregoing general terms, reference will now be made to the accompanying drawings, which are not necessarily drawn to scale, and wherein:

FIG. 1 is a perspective view of an example embodiment of a microheater according to the present disclosure;

FIG. 2 is a perspective view of an example embodiment of a smoking article according to the disclosure, wherein a portion of an outer shell of the article is cut away to reveal the interior components thereof;

FIG. 3 is a perspective view of an example embodiment of a smoking article according to the disclosure, wherein the article comprises a control body and a cartridge that are attachable and detachable therefrom;

FIG. 4 is a perspective view of a substrate having a plurality of microheaters contained thereon according to an example embodiment of the disclosure;

FIG. 5 is a longitudinal cross-section through line A-A of the substrate illustrated in FIG. 4 showing the microheaters recessed within wells in the substrate and covered with an aerosol precursor composition;

FIG. 6 is a perspective view of a substrate according to an example embodiment of the disclosure, wherein the substrate includes two layers with a plurality of microheaters therebetween;

FIG. 7 is a perspective view of an example embodiment of a smoking article according to the disclosure, wherein the article comprises a unitary body with a hinged door providing access to a cavity therein that receives a substrate comprising an aerosol precursor composition and that is lined with a plurality of microheaters;

FIG. 8 is a perspective view of an atomizer according to an example embodiment of the disclosure; and FIG. 9 is a perspective view of a further atomizer according to an example embodiment of the disclosure.

DETAILED DESCRIPTION OF THE INVENTION

The present invention will now be described more fully hereinafter with reference to exemplary embodiments thereof. These exemplary embodiments are described so that this disclosure will be thorough and complete, and will fully convey the scope of the invention to those skilled in the art. Indeed, the invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The present invention provides articles that use electrical energy to heat a material (preferably without combusting the material to any significant degree) to form an inhalable substance, the articles being sufficiently compact to be considered "hand-held" devices. In certain embodiments, the articles can particularly be characterized as smoking articles. As used herein, the term is intended to mean an article that provides the taste and/or the sensation (e.g., hand-feel or mouth-feel) of smoking a cigarette, cigar, or pipe without substantial combustion of any component of the article. The term smoking article does not necessarily indicate that, in operation, the article produces smoke in the sense of the by-product of combustion or pyrolysis. Rather, smoking relates to the physical action of an individual in using the article—e.g., holding the article, drawing on one end of the article, and inhaling from the article. In further embodiments, the inventive articles can be characterized as being vapor-producing articles, aerosolization articles, or medicament delivery articles. Thus, the articles can be arranged so as to provide one or more substances in an inhalable state. In other embodiments, the inhalable substance can be substantially in the form of a vapor (i.e., a substance that is in the gas phase at a temperature lower than its critical point). In other embodiments, the inhalable substance can be in the form of an aerosol (i.e., a suspension of fine solid particles or liquid droplets in a gas). The physical form of the inhalable substance is not necessarily limited by the nature of the inventive articles but rather may depend upon the nature of the medium and the inhalable substance itself as to whether it exists in a vapor state or an aerosol state. In some embodiments, the terms may be interchangeable. Thus, for simplicity, the terms as used to describe the invention are understood to be interchangeable unless stated otherwise.

In one aspect, the present invention provides a smoking article. The smoking article generally can include a number of components provided within an elongated body, which can be a single, unitary shell or which can be formed of two or more separable pieces. For example, a smoking article according to one embodiment can comprise a shell (i.e., the elongated body) that can be substantially tubular in shape, such as resembling the shape of a conventional cigarette or cigar. Within the shell can reside all of the components of the smoking article (one or more of which may be replaceable). In other embodiments, a smoking article can comprise two shells that are joined and are separable. For example, a control body can comprise a shell containing one or more reusable components and having an end that removably attaches to a cartridge. The cartridge can comprise a shell containing one or more disposable components and having an end that removably attaches to the control body. More specific arrangements of components within the single shell or within the separable control body and cartridge are evident in light of the further disclosure provided herein.

Smoking articles useful according to the invention particularly can comprise some combination of a power source (i.e., an electrical power source), one or more control components (e.g., to control/actuate/regulate flow of power from the power source to one or more further components of the article), a heater component, and an aerosol precursor component. The smoking article further can include a defined air flow path through the article such that aerosol generated by the article can be withdrawn therefrom by a user drawing on the article. Alignment of the components within the article can vary. In specific embodiments, the aerosol precursor component can be located near an end of the article that is proximal to the mouth of a user so as to maximize aerosol delivery to the user. Other configurations, however, are not excluded. Generally, the heater component can be positioned sufficiently near the aerosol precursor component so that heat from the heater component can volatilize the aerosol precursor (as well as one or more flavorants, medicaments, or the like that may likewise be provided for delivery to a user) and form an aerosol for delivery to the user. When the heating member heats the aerosol precursor component, an aerosol (alone or including a further inhalable substance) is formed, released, or generated in a physical form suitable for inhalation by a consumer. It should be noted that the foregoing terms are meant to be interchangeable. As such, the terms release, generate, and form can be interchangeable, the terms releasing, generating, and forming can be interchangeable, the terms releases, forms, and generates can be interchangeable, and the terms released, formed, and generated can be interchangeable. Specifically, an inhalable substance is released as a vapor or aerosol or mixture thereof.

A smoking article according to the invention comprises a heating member that heats an aerosol precursor component to produce an aerosol for inhalation by a user. A smoking article as described herein can be particularly characterized by comprising a microheater as a heating member. Specifically, the microheater can be in electrical connection with an electrical power source, as further described herein. The smoking article can include only a single microheater. In other embodiments, however, the smoking article can comprise a plurality of microheaters. Thus, it is understood that although the present disclosure may describe the smoking article in terms of "a" microheater or "the" microheater, the disclosure is meant to encompass embodiments wherein the smoking article includes a plurality of microheaters.

In some embodiments, the microheater used in the presently described smoking article can be characterized as a Micro-Electro-Mechanical Systems (MEMS) based heater. MEMS based heaters have been used previously in subminiature micro-sensors such as wind sensors, humidity sensors, and gas sensors. Such MEMS based microheaters can emit heat by applying an electrical current to a resistor and can provide advantages such as low power input requirement and very short response time. A MEMS based microheater is highly advantageous in a smoking article, as presently described, since it can provide for low voltage and/or low power device function.

The microheater used in the presently described smoking article also can be characterized as a thin film heater or a hot film heater. This can be particularly descriptive of the physical nature of the microheater, which can comprise an electrically conductive material that specifically can be provided in the form of a film—i.e., an electrically conductive layer. In certain embodiments, the electrically conductive material can be patterned. In other words, the electrically conductive material can be present in the microheater in a specific pattern and, as such, refers to the physical nature of the finished microheater and is not limited to a method of making the microheater. The thickness of the electrically conductive layer can vary and can be, for example, about 5 μm or less, about 4 μm or less, about 3 μm or less, about 2 μm or less, about 1 μm or less, about 0.75 μm or less, about 0.5 μm or less, about 0.25 μm or less, about 0.1 μm or less, or about 0.075 μm or less. In other embodiments, the electrically conductive layer can have a thickness of about 0.01 μm to about 5 μm, about 0.05 μm to about 3 μm, about 0.1 μm to about 2.5 μm, about 0.2 μm to about 2 μm, or about 0.5 μm to about 1 μm.

The electrically conductive material used in the microheater can comprise essentially any material that is both electrically conductive and suitable for thin film formation in the size ranges discussed above. For example, the electrically conductive material can be selected from the group consisting of elemental metals, metal alloys, silicon (including single crystal silicon and poly-silicon), ceramics, carbon, carbides, nitrides, and combinations thereof. In more specific embodiments, the electrically conductive material can be formed of platinum, gold, silver, copper, aluminum, tungsten, zinc, nickel, titanium, nichrome, silicon carbide, poly-silicon, single crystal silicon, titanium nitride, and the like. In particular embodiments, elemental metals, such as platinum, can be particularly beneficial due to exhibiting good oxidation resistance and long-term stability. A thin film microheater according to the present disclosure can exhibit a high level of ruggedness and stability that can be preferred over more fragile and less stable hot wires.

In addition to the electrically conductive layer, a microheater according to the present disclosure can comprise a supporting layer. In particular, the electrically conductive material may be patterned on such supporting layer. The supporting layer preferably is formed of a material that is temperature stable under the heater operating temperatures. For example, the supporting layer can be temperature stable at a temperature of about 150° C. or greater, about 200° C. or greater, about 300° C. or greater, about 400° C. or greater, or about 500° C. or greater. In other embodiments, the supporting layer can be temperature stable in a temperature range of about 125° C. to about 750° C., about 150° C. to about to about 650° C., or about 175° C. to about 500° C. In some embodiments, the supporting layer can be formed of a ceramic material, particularly a silicon-based material. One specific example of a supporting layer material is a silicon nitride material. Other materials, however, such as glass or quartz can be used. Certain thermoplastic materials, such as cyclic olefin copolymers (COC), also can be used. The supporting layer can be formed of an insulating material or can include an insulating layer.

A microheater according to the present disclosure still further can comprise a protective layer overlying the electrically conductive layer. The protective layer preferably is formed of a material such that the protective layer is temperature stable under the operating temperatures for the microheater and that is heat radiant and/or heat conductive. For example, the protective layer can be temperature stable at a temperature of about 150° C. or greater, about 200° C. or greater, about 300° C. or greater, about 400° C. or greater, or about 500° C. or greater. In other embodiments, the protective layer can be temperature stable in a temperature range of about 125° C. to about 750° C., about 150° C. to about to about 650° C., or about 175° C. to about 500° C. In some embodiments, the protective layer can be in direct contact with an aerosol precursor composition or component thereof. Accordingly, it is preferable for the protective layer to be substantially chemically non-reactive with the various compounds that may be included in the aerosol precursor material. By substantially chemically non-reactive is meant that any chemical reaction between the protective layer and a component of the aerosol precursor material is sufficiently limited such that the protective layer is not breached so as to allow the aerosol precursor composition to be in direct contact with the electrically conductive layer of the microheater. Alternately, the phrase can mean that any chemical reaction between the protective layer and a component of the aerosol precursor material is sufficiently limited such that chemical compounds present in the protective layer are not released (or new chemical compounds formed) so as to combine with the formed aerosol for inhalation by a consumer. In some embodiments, the supporting layer can be formed of a ceramic material, particularly a silicon-based material. One specific example of a supporting layer material is a silicon dioxide material. Other materials, however, such as glass or quartz can be used.

The microheater particularly can be characterized as being a multi-layer article. Specifically, the microheater can comprise two or more layers. In other embodiments, the microheater can be characterized as comprising an electrically conductive material sandwiched between two layers or two membranes. The thickness of the further layers, such as the supporting layer and the protective layer can vary depending upon the application. In some embodiments, the further layers can be similar in size to the electrically conductive layer. In other embodiments, the further layers can be greater in thickness than the electrically conductive layer, such as each independently having a thickness of up to about 0.5 mm, up to about 0.75 mm, up to about 1 mm, up to about 1.5 mm, up to about 2 mm, or up to about 5 mm.

The microheater in its functioning form can be characterized in relation to its further dimensions as well. Specifically, the microheater can have a length and a width that are independently up to about 5 mm, up to about 4 mm, up to about 3 mm, or up to about 2 mm. In other embodiments, the length and width of the microheater independently can be about 0.25 mm to about 5 mm, about 0.5 mm to about 3 mm, about 0.6 mm to about 2.5 mm, about 0.7 mm to about 2 mm, or about 0.75 mm to about 1.5 mm.

An exemplary embodiment of a microheater that can be used according to the present disclosure is shown in FIG. 1. As seen therein, the microheater 50 is formed of a supporting layer 510, a protective layer 540, and a patterned electrically conductive layer 520 sandwiched in between the supporting layer and the protective layer. Each layer can be formed of materials and have dimensions as described herein. The microheater also include terminals 530 extending from the electrically conductive layer to provide for an electrical connection of the microheater (specifically the electrically conductive material) with the further electrical components of the article described herein, including the various control components and the electrical power source.

Preferably, the microheater is positioned within an article as described herein such that the terminals do not come into contact with the aerosol precursor composition. Moreover, the microheater can include further components designed to isolate the terminals from the portion of the protective layer that is contacted with the aerosol precursor composition for aerosol formation. As illustrated, the protective layer is partially transparent, but microheaters useful as described herein need not necessarily be transparent, and such characteristics can vary depending upon the materials utilized. Likewise, the supporting layer and the protective layer can have the same or different dimensions, and the patterning of the electrically conductive layer can vary.

Microheaters useful in a smoking article as described herein can be prepared by a variety of suitable processes. For example, low pressure chemical vapor deposition (LPCVD) can be used to achieve a layered build of a microheater. More particularly, the supporting layer can be deposited on a build substrate (e.g., a silicon wafer, a ceramic such as a metal nitride, quartz, or glass) via LPCVD. Thereafter, the electrically conductive material can be deposited over the supporting layer also using LPCVD. The electrically conductive layer can be patterned as desired to provide the desired performance properties for the microheater. For instance, reactive ion etching (REI) can be used. Electrical contacts can be formed, such as using a sputtering process, to provide means for electrical connection of the electrically conductive material. The protective layer can be formed over the electrically conductive layer using, for example, plasma enhanced chemical vapor deposition (PECVD). The completed microheater can be removed from the build substrate if desired. For example, anisotropic etching with a deep REI process can be used to remove part or all of a silicon build substrate. Further, if desired, the layered microheater can be packaged, such as to provide ease of access to the electrical contacts while simultaneously providing further protection of the functional components of the microheater. For example, packaging can be used so as to hermetically seal the microheater within a thermally stable and thermally conductive material.

Other means for preparing a microheater useful in the present articles can include metal evaporation processes for laying a conductive layer on a support layer. If necessary, an adhesion layer can be laid prior to the metal evaporation step. Patterning of an electrically conductive material can be carried out using a photoresist according to standard photolithography techniques (e.g., Shipley-1818), which can include the following steps: spin-coating the photoresist on the electrically conductive layer; soft-baking (e.g., at a temperature of about 65° C.) to drive off the photoresist solvent; aligning the applied photoresist, such as in a mask aligner, exposing the electrically conductive layer while pressed against the desired mask, such as using a UV lamp, and developing to dissolve the patterned photoresist using the appropriate developer (such as that commercially available from Shipley); and hard-baking (e.g., at a temperature of about 90° C.) to cure the photoresist. With the photoresist applied, etching with a suitable solvent can be used to remove the still exposed electrically conductive material. Thereafter, the photoresist can be removed using a suitable solvent. Such processing can be characterized as subtractive fabrication, and the formed microheater generally or the conductive layer specifically can be described as a subtractively fabricated article or layer.

Still further, various printing techniques can be used to prepare the microheater. Specifically, inkjet-type printing techniques can be utilized to systematically lay the conductive material in the desired pattern. This can be particularly useful in forming the conductive layer over the supporting layer, which itself can be relatively thin, without the need for a further build substrate. Such techniques wherein the electrically conductive material is a printed layer overlying the supporting layer can be characterized as additive fabrication, and the formed microheater generally or the conductive layer specifically can be described as an additively fabricated article or layer.

The foregoing processes are only exemplary of the types of processes that can be used to prepare a microheater for use according to the present disclosure and should not be viewed as limiting the microheaters that can be used in the presently described articles. Further, suitable microheaters for use as described herein can be obtained commercially from, for example, Kebaili Corporation (Irvine, CA, www.kebaili.com).

In further embodiments, a microheater for use in a device of the present disclosure can be chemical in nature. More specifically, the microheater can provide heating based upon a chemical reaction rather than based upon electrical resistance heating.

The microheaters used in the presently described articles can provide several advantages over the use of known heating elements. Such microheaters can particularly provide highly energy-efficient electrical heating, particularly when defined aliquots of material to be heated (e.g., aerosol precursor compositions) are delivered to the microheater in a controlled manner. The microheaters likewise can facilitate achieving highly precise aerosol chemistries in a controlled manner.

A smoking article as described herein generally can include an electrical power source (or electrical power sources) to provide current flow that is sufficient to provide various functionalities to the article, such as powering of the microheaters, powering of indicators, and the like. The power source can take on various embodiments. Preferably, the power source is able to deliver sufficient power to rapidly heat the microheater to provide for aerosol formation and power the article through use for the desired duration of time. The power source preferably is sized to fit conveniently within the article. Examples of useful power sources include lithium ion batteries that preferably are rechargeable (e.g., a rechargeable lithium-manganese dioxide battery). In particular, lithium polymer batteries can be used. Other types of batteries—e.g., N50-AAA CADNICA nickel-cadmium cells—may also be used. Even further examples of batteries that can be used according to the invention are described in US Pub. App. No. 2010/0028766, the disclosure of which is incorporated herein by reference in its entirety. Thin film batteries may be used in certain embodiments of the invention. Any of these batteries or combinations thereof can be used in the power source, but rechargeable batteries are preferred because of cost and disposal considerations associated with disposable batteries. In embodiments wherein disposable batteries are provided, the smoking article can include access for removal and replacement of the battery. Alternatively, in embodiments where rechargeable batteries are used, the smoking article can comprise charging contacts for interaction with corresponding contacts in a conventional recharging unit deriving power from a standard 120-volt AC wall outlet, or other sources such as an automobile electrical system or a separate portable power supply, including USB connections. Means for recharging the battery can be provided in a portable charging case that can include, for example, a relatively larger battery unit that can provide multiple charges for the relatively smaller batteries present in the smoking article. The article further can include components for providing a non-contact inductive recharging system such that the article can be charged without being physically connected to an external power source. Thus, the article can include components to facilitate transfer of energy from an electromagnetic field to the rechargeable battery within the article.

In further embodiments, the power source also can comprise a capacitor. Capacitors are capable of discharging more quickly than batteries and can be charged between puffs, allowing the battery to discharge into the capacitor at a lower rate than if it were used to power the heating member directly. For example, a supercapacitor—i.e., an electric double-layer capacitor (EDLC)—may be used separate from or in combination with a battery. When used alone, the supercapacitor may be recharged before each use of the article. Thus, the invention also may include a charger component that can be attached to the smoking article between uses to replenish the supercapacitor.

The smoking article can further include a variety of power management software, hardware, and/or other electronic control components. For example, such software, hardware, and/or electronic controls can include carrying out charging of the battery, detecting the battery charge and discharge status, performing power save operations, preventing unintentional or over-discharge of the battery, puff counting, puff delimiting puff duration, identifying cartridge status, temperature control, or the like.

A "controller" or "control component" according to the present disclosure can encompass a variety of elements useful in the present smoking article. Moreover, a smoking article according to the invention can include one, two, or even more control components that can be combined into a unitary element or that can be present at separate locations within the smoking article, and individual control components can be utilized for carrying out different control aspects. For example, a smoking article can include a control component that is integral to or otherwise combined with a battery so as to control power discharge from the battery. The smoking article separately can include a control component that controls other aspects of the article. The smoking article also can include a control component in a cartridge for providing specific functionalities, including data storage (e.g., a microchip that includes memory). Alternatively, a single controller may be provided that carries out multiple control aspects or all control aspects of the article. Likewise, a sensor (e.g., a puff sensor) used in the article can include a control component that controls the actuation of power discharge from the power source in response to a stimulus. The article separately can include a control component that controls other aspects of the article. Alternatively, a single controller may be provided in or otherwise associated with the sensor for carrying out multiple control aspects or all control aspects of the article. Thus, a variety of combinations of controllers may be combined in the present smoking article to provide the desired level of control of all aspects of the device.

The smoking article also can comprise one or more controller components useful for controlling flow of electrical energy from the power source to further components of the article, such as to a resistive heating element. Specifically, the article can comprise a control component that actuates current flow from the power source, such as to the microheater. For example, in some embodiments, the article can include a pushbutton that can be linked to a control circuit for manual control of power flow. One or more pushbuttons present can be substantially flush with an outer surface of the smoking article.

Instead of (or in addition to) the pushbutton, the inventive article can include one or more control components responsive to the consumer's drawing on the article (i.e., puff-actuated heating). For example, the article may include a switch that is sensitive either to pressure changes or air flow changes as the consumer draws on the article (i.e., a puff-actuated switch). Other current actuation/deactuation mechanisms may include a temperature actuated on/off switch or a lip pressure actuated switch. An exemplary mechanism that can provide such puff-actuation capability includes a Model 163PC01D36 silicon sensor, manufactured by the MicroSwitch division of Honeywell, Inc., Freeport, Ill. Further examples of demand-operated electrical switches that may be employed in a heating circuit according to the present invention are described in U.S. Pat. No. 4,735,217 to Gerth et al., which is incorporated herein by reference in its entirety. Other suitable differential switches, analog pressure sensors, flow rate sensors, or the like, will be apparent to the skilled artisan with the knowledge of the present disclosure. A pressure-sensing tube or other passage providing fluid connection between the puff actuated switch and an air flow passage within the smoking article can be included so that pressure changes during draw are identified by the switch. Further description of current regulating circuits and other control components, including microcontrollers, that can be useful in the present smoking article are provided in U.S. Pat. Nos. 4,922,901, 4,947,874, and 4,947,875, all to Brooks et al., U.S. Pat. No. 5,372,148 to McCafferty et al., U.S. Pat. No. 6,040,560 to Fleischhauer et al., and U.S. Pat. No. 7,040,314 to Nguyen et al., all of which are incorporated herein by reference in their entireties.

Capacitive sensing components in particular can be incorporated into the device in a variety of manners to allow for diverse types of "power-up" and/or "power-down" for one or more components of the device. Capacitive sensing can include the use of any sensor incorporating technology based on capacitive coupling including, but not limited to, sensors that detect and/or measure proximity, position or displacement, humidity, fluid level, pressure, temperature, or acceleration. Capacitive sensing can arise from electronic components providing for surface capacitance, projected capacitance, mutual capacitance, or self capacitance. Capacitive sensors generally can detect anything that is conductive or has a dielectric different than that of air. Capacitive sensors, for example, can replace mechanical buttons (i.e., the push-button referenced above) with capacitive alternatives. Thus, one specific application of capacitive sensing according to the invention is a touch capacitive sensor. For example, a touch pad can be present on the smoking article that allows the user to input a variety of commands. Most basically, the touch pad can provide for powering the heating element much in the same manner as a push button, as already described above. In other embodiments, capacitive sensing can be applied near the mouthend of the smoking article such that the pressure of the lips on the smoking article to draw on the article can signal the device to provide power to the heating element. In addition to touch capacitance sensors, motion capacitance sensors, liquid capacitance sensors, and accelerometers can be utilized according to the invention to elicit a variety of response from the smoking article. Further, photoelectric sensors also can be incorporated into the inventive smoking article.

Sensors utilized in the present articles can expressly signal for power flow to the heating element so as to heat the aerosol precursor composition and form a vapor or aerosol for inhalation by a user. Sensors also can provide further functions. For example, a "wake-up" sensor can be included. Other sensing methods providing similar function likewise can be utilized according to the invention.

When the consumer draws on the mouth end of the smoking article, the current actuation means can permit unrestricted or uninterrupted flow of current through the resistive heating member to generate heat rapidly. It can be useful to include current regulating components to regulate current flow through the microheater to control heating rate and/or heating duration.

The current regulating circuit particularly may be time based. Specifically, such a circuit includes a means for permitting uninterrupted current flow through the heating element for an initial time period during draw, and a timer means for subsequently regulating current flow until draw is completed. Further, regulation may comprise simply allowing uninterrupted current flow until the desired temperature is achieved then turning off the current flow completely. The heating member may be reactivated by the consumer initiating another puff on the article (or manually actuating the pushbutton, depending upon the specific switch embodiment employed for activating the heater). Alternatively, the subsequent regulation can involve the modulation of current flow through the heating element to maintain the heating element within a desired temperature range (including pulse width modulation). In some embodiments, so as to release the desired dosing of the inhalable substance, the heating member may be energized for a duration of about 0.2 second to about 5.0 seconds, about 0.3 second to about 4.5 seconds, about 0.5 second to about 4.0 seconds, about 0.5 second to about 3.5 seconds, or about 0.6 second to about 3.0 seconds. Further description of such time-based current regulating circuits and other control components that can be useful in the present smoking article are provided in U.S. Pat. Nos. 4,922,901, 4,947,874, and 4,947,875, all to Brooks et al., all of which are incorporated herein by reference in their entireties.

The control components particularly can be configured to closely control the amount of heat provided to the microheater. In some embodiments, the current regulating component can function to stop current flow to the microheater once a defined temperature has been achieved. Such defined temperature can be in a range that is substantially high enough to volatilize the aerosol precursor composition and any further inhalable substances and provide an amount of aerosol in a desired concentration. While the heat needed to volatilize the aerosol precursor composition can vary, it can be particularly useful for the microheater to heat to a temperature of about 120° C. or greater, about 130° C. or greater, about 140° C. or greater, or about 160° C. or greater. In some embodiments, in order to volatilize a desired amount of the aerosol precursor composition, the heating temperature may be about 180° C. or greater, about 200° C. or greater, about 300° C. or greater, or about 350° C. or greater. In further embodiments, the defined temperature for aerosol formation can be about 120° C. to about 350° C., about 140° C. to about 300° C., or about 150° C. to about 250° C. The temperature and time of heating can be controlled by one or more components contained in the control housing. The current regulating component likewise can cycle the current to the microheater off and on once a defined temperature has been achieved so as to maintain the defined temperature for a defined period of time.

Still further, the current regulating component can cycle the current to the microheater off and on to maintain a first temperature that is below an aerosol forming temperature and then allow an increased current flow in response to a current actuation control component so as to achieve a second temperature that is greater than the first temperature and that is an aerosol forming temperature. Such controlling can improve the response time of the article for aerosol formation such that aerosol formation begins almost instantaneously upon initiation of a puff by a consumer. In some embodiments, the first temperature (which can be characterized as a standby temperature) can be only slightly less than the aerosol forming temperature defined above. Specifically, the standby temperature can be about 50° C. to about 150° C., about 70° C. to about 140° C., about 80° C. to about 120° C., or about 90° C. to about 110° C.

In addition to the above control elements, the smoking article also may comprise one or more indicators. Such indicators may be lights (e.g., light emitting diodes) that can provide indication of multiple aspects of use of the inventive article. Further, LED indicators may be positioned at the distal end of the smoking article to simulate color changes seen when a conventional cigarette is lit and drawn on by a user. Other indices of operation also are encompassed. For example, visual indicators also may include changes in light color or intensity to show progression of the smoking experience. Tactile indicators and audio indicators similarly are encompassed by the invention. Moreover, combinations of such indicators also may be used in a single article.

In certain embodiments, a smoking article according to the present invention can include tobacco, a tobacco component, or a tobacco-derived material (i.e., a material that is found naturally in tobacco that may be isolated directly from the tobacco or synthetically prepared). The tobacco that is employed can include, or can be derived from, tobaccos such as flue-cured tobacco, burley tobacco, Oriental tobacco, Maryland tobacco, dark tobacco, dark-fired tobacco and Rustica tobacco, as well as other rare or specialty tobaccos, or blends thereof. Various representative tobacco types, processed types of tobaccos, and types of tobacco blends are set forth in U.S. Pat. No. 4,836,224 to Lawson et al.; U.S. Pat. No. 4,924,888 to Perfetti et al.; U.S. Pat. No. 5,056,537 to Brown et al.; U.S. Pat. No. 5,159,942 to Brinkley et al.; U.S. Pat. No. 5,220,930 to Gentry; U.S. Pat. No. 5,360,023 to Blakley et al.; U.S. Pat. No. 6,701,936 to Shafer et al.; U.S. Pat. No. 6,730,832 to Dominguez et al., U.S. Pat. No. 7,011,096 to Li et al.; U.S. Pat. No. 7,017,585 to Li et al.; U.S. Pat. No. 7,025,066 to Lawson et al.; US Pat. App. Pub. No. 2004/0255965 to Perfetti et al.; PCT Pub. WO 02/37990 to Bereman; and Bombick et al., *Fund. Appl. Toxicol.,* 39, p. 11-17 (1997); the disclosures of which are incorporated herein by reference in their entireties.

The tobacco that is incorporated within the smoking article can be employed in various forms; and combinations of various forms of tobacco can be employed, or different forms of tobacco can be employed at different locations within the smoking article. For example, the tobacco can be employed in the form of a tobacco extract. See, for example, U.S. Pat. No. 7,647,932 to Cantrell et al. and US Pat. Pub. No. 2007/0215167 to Crooks et al., the disclosures of which are incorporated herein by reference in their entireties.

The smoking article can incorporate tobacco additives of the type that are traditionally used for the manufacture of tobacco products. Those additives can include the types of materials used to enhance the flavor and aroma of tobaccos used for the production of cigars, cigarettes, pipes, and the like. For example, those additives can include various cigarette casing and/or top dressing components. See, for example, U.S. Pat. No. 3,419,015 to Wochnowski; U.S. Pat. No. 4,054,145 to Berndt et al.; U.S. Pat. No. 4,887,619 to Burcham, Jr. et al.; U.S. Pat. No. 5,022,416 to Watson; U.S. Pat. No. 5,103,842 to Strang et al.; and U.S. Pat. No. 5,711,320 to Martin; the disclosures of which are incorporated herein by reference in their entireties. Preferred casing materials include water, sugars and syrups (e.g., sucrose, glucose and high fructose corn syrup), humectants (e.g. glycerin or propylene glycol), and flavoring agents (e.g., cocoa and licorice). Those added components also include top dressing materials (e.g., flavoring materials, such as menthol). See, for example, U.S. Pat. No. 4,449,541 to Mays et al., the disclosure of which is incorporated herein by reference in its entirety. Further materials that can be added include those disclosed in U.S. Pat. No. 4,830,028 to Lawson et al. and US Pat. Pub. No. 2008/0245377 to Marshall et al., the disclosures of which are incorporated herein by reference in their entireties.

Various manners and methods for incorporating tobacco into smoking articles, and particularly smoking articles that are designed so as to not purposefully burn virtually all of the tobacco within those smoking articles, are set forth in U.S. Pat. No. 4,947,874 to Brooks et al.; U.S. Pat. No. 7,647,932 to Cantrell et al., US Pat. App. Pub. No. 2005/0016549 to Banerjee et al.; and US Pat. App. Pub. No. 2007/0215167 to Crooks et al.; the disclosures of which are incorporated herein by reference in their entireties.

Further tobacco materials, such as a tobacco aroma oil, a tobacco essence, a spray dried tobacco extract, a freeze dried tobacco extract, tobacco dust, or the like may be included in the vapor precursor or aerosol precursor composition. As used herein, the term “tobacco extract” means components separated from, removed from, or derived from, tobacco using tobacco extraction processing conditions and techniques. Purified extracts of tobacco or other botanicals specifically can be used. Typically, tobacco extracts are obtained using solvents, such as solvents having an aqueous nature (e.g., water) or organic solvents (e.g., alcohols, such as ethanol or alkanes, such as hexane). As such, extracted tobacco components are removed from tobacco and separated from the unextracted tobacco components; and for extracted tobacco components that are present within a solvent, (i) the solvent can be removed from the extracted tobacco components, or (ii) the mixture of extracted tobacco components and solvent can be used as such. Exemplary types of tobacco extracts, tobacco essences, solvents, tobacco extraction processing conditions and techniques, and tobacco extract collection and isolation procedures, are set forth in Australia Pat. No. 276,250 to Schachner; U.S. Pat. No. 2,805,669 to Meriro; U.S. Pat. No. 3,316,919 to Green et al.; U.S. Pat. No. 3,398,754 to Tughan; U.S. Pat. No. 3,424,171 to Rooker; U.S. Pat. No. 3,476,118 to Luttich; U.S. Pat. No. 4,150,677 to Osborne; U.S. Pat. No. 4,131,117 to Kite; U.S. Pat. No. 4,506,682 to Muller; U.S. Pat. No. 4,986,286 to Roberts et al.; U.S. Pat. No. 5,005,593 to Fagg; U.S. Pat. No. 5,065,775 to Fagg; U.S. Pat. No. 5,060,669 to White et al.; U.S. Pat. No. 5,074,319 to White et al.; U.S. Pat. No. 5,099,862 to White et al.; U.S. Pat. No. 5,121,757 to White et al.; U.S. Pat. No. 5,131,415 to Munoz et al.; U.S. Pat. No. 5,230,354 to Smith et al.; U.S. Pat. No. 5,235,992 to Sensabaugh; U.S. Pat. No. 5,243,999 to Smith; U.S. Pat. No. 5,301,694 to Raymond; U.S. Pat. No. 5,318,050 to Gonzalez-Parra et al.; U.S. Pat. No. 5,435,325 to Clapp et al.; and U.S. Pat. No. 5,445,169 to Brinkley et al.; the disclosures of which are incorporated herein by reference in their entireties.

The aerosol precursor or vapor precursor composition can comprise one or more different components. For example, the aerosol precursor can include a polyhydric alcohol (e.g., glycerin, propylene glycol, or a mixture thereof). Representative types of further aerosol precursor compositions are set forth in U.S. Pat. No. 4,793,365 to Sensabaugh, Jr. et al.; U.S. Pat. No. 5,101,839 to Jakob et al.; PCT WO 98/57556 to Biggs et al.; and Chemical and Biological Studies on New Cigarette Prototypes that Heat Instead of Burn Tobacco, R. J. Reynolds Tobacco Company Monograph (1988); the disclosures of which are incorporated herein by reference. In some embodiments, an aerosol precursor composition can produce a visible aerosol upon the application of sufficient heat thereto (and cooling with air, if necessary), and the aerosol precursor composition can produce an aerosol that can be considered to be “smoke-like.” In other embodiments, the aerosol precursor composition can produce an aerosol that can be substantially non-visible but can be recognized as present by other characteristics, such as flavor or texture. Thus, the nature of the produced aerosol can vary depending upon the specific components of the aerosol precursor composition. The aerosol precursor composition can be chemically simple relative to the chemical nature of the smoke produced by burning tobacco.

Aerosol precursor compositions can include further liquid materials, such as water. For example, aerosol precursor compositions can incorporate mixtures of glycerin and water, or mixtures of propylene glycol and water, or mixtures of propylene glycol and glycerin, or mixtures of propylene glycol, glycerin, and water. Exemplary aerosol precursor compositions also include those types of materials incorporated within devices available through Atlanta Imports Inc., Acworth, Ga., USA., as an electronic cigar having the brand name E-CIG, which can be employed using associated Smoking Cartridges Type C1a, C2a, C3a, C4a, C1b, C2b, C3b and C4b; and as Ruyan Atomizing Electronic Pipe and Ruyan Atomizing Electronic Cigarette from Ruyan SBT Technology and Development Co., Ltd., Beijing, China.

The aerosol precursor composition used in the disclosed article further can comprise one or more flavors, medicaments, or other inhalable materials. For example, liquid nicotine can be used. Such further materials can comprise one or more components of the aerosol precursor or vapor precursor composition. Thus, the aerosol precursor or vapor precursor composition can be described as comprising an inhalable substance. Such inhalable substance can include flavors, medicaments, and other materials as discussed herein. Particularly, an inhalable substance delivered using a smoking article according to the present invention can comprise a tobacco component or a tobacco-derived material. Alternately, the flavor, medicament, or other inhalable material can be provided separate from other aerosol precursor components—e.g., in a reservoir. As such, defined aliquots of the flavor, medicament, or other inhalable material may be separately or simultaneously delivered to the resistive heating element to release the flavor, medicament, or other inhalable material into an air stream to be inhaled by a user along with the further components of the aerosol precursor or vapor precursor composition. Alternatively, the flavor, medicament, or other inhalable material may be provided in a separate portion of the smoking article or a component thereof. In specific embodiments, the flavor, medicament, or other inhalable material can be deposited on a substrate (e.g., a paper or other porous material) that is located in proximity to the microheater. The proximity preferably is sufficient such that heating of the microheater provides heat to the substrate sufficient to volatilize and release the flavor, medicament, or other inhalable material from the substrate.

A wide variety of types of flavoring agents, or materials that alter the sensory or organoleptic character or nature of the mainstream aerosol of the smoking article, can be employed. Such flavoring agents can be provided from sources other than tobacco, can be natural or artificial in nature, and can be employed as concentrates or flavor packages. Of particular interest are flavoring agents that are applied to, or incorporated within, those regions of the smoking article where aerosol is generated. Again, such agents can be supplied directly to the resistive heating element or may be provided on a substrate as already noted above. Exemplary flavoring agents include vanillin, ethyl vanillin, cream, tea, coffee, fruit (e.g., apple, cherry, strawberry, peach and citrus flavors, including lime and lemon), maple, menthol, mint, peppermint, spearmint, wintergreen, nutmeg, clove, lavender, cardamom, ginger, honey, anise, sage, cinnamon, sandalwood, jasmine, cascarilla, cocoa, licorice, and flavorings and flavor packages of the type and character traditionally used for the flavoring of cigarette, cigar, and pipe tobaccos. Syrups, such as high fructose corn syrup, also can be employed. Flavoring agents also can include acidic or basic characteristics (e.g., organic acids, such as levulinic acid, succinic acid, lactic acid, and pyruvic acid). The flavoring agents can be combined with the aerosol-generating material if desired. Exemplary plant-derived compositions that may be used are disclosed in U.S. application Ser. No. 12/971,746 to Dube et al. and U.S. application Ser. No. 13/015,744 to Dube et al., the disclosures of which are incorporated herein by reference in their entireties.

Organic acids particularly may be incorporated into the aerosol precursor to affect the flavor, sensation, or organoleptic properties of medicaments, such as nicotine, that may be combined with the aerosol precursor. For example, organic acids, such as levulinic acid, succinic acid, lactic acid, and pyruvic acid, may be included in the aerosol precursor with nicotine in amounts up to being equimolar (based on total organic acid content) with the nicotine. Any combination of organic acids can be used. For example, the aerosol precursor can include about 0.1 to about 0.5 moles of levulinic acid per one mole of nicotine, about 0.1 to about 0.5 moles of pyruvic acid per one mole of nicotine, about 0.1 to about 0.5 moles of lactic acid per one mole of nicotine, or combinations thereof, up to a concentration wherein the total amount of organic acid present is equimolar to the total amount of nicotine present in the aerosol precursor.

The aerosol precursor composition may take on a variety of conformations based upon the various amounts of materials utilized therein. For example, a useful aerosol precursor composition may comprise up to about 98% by weight up to about 95% by weight, or up to about 90% by weight of a polyol. This total amount can be split in any combination between two or more different polyols. For example, one polyol can comprise about 50% to about 90%, about 60% to about 90%, or about 75% to about 90% by weight of the aerosol precursor, and a second polyol can comprise about 2% to about 45%, about 2% to about 25%, or about 2% to about 10% by weight of the aerosol precursor. A useful aerosol precursor also can comprise up to about 25% by weight, about 20% by weight or about 15% by weight water—particularly about 2% to about 25%, about 5% to about 20%, or about 7% to about 15% by weight water. Flavors and the like (which can include medicaments, such as nicotine) can comprise up to about 10%, up to about 8%, or up to about 5% by weight of the aerosol precursor.

As a non-limiting example, an aerosol precursor according to the invention can comprise glycerol, propylene glycol, water, nicotine, and one or more flavors. Specifically, the glycerol can be present in an amount of about 70% to about 90% by weight, about 70% to about 85% by weight, or about 75% to about 85% by weight, the propylene glycol can be present in an amount of about 1% to about 10% by weight, about 1% to about 8% by weight, or about 2% to about 6% by weight, the water can be present in an amount of about 10% to about 20% by weight, about 10% to about 18% by weight, or about 12% to about 16% by weight, the nicotine can be present in an amount of about 0.1% to about 5% by weight, about 0.5% to about 4% by weight, or about 1% to about 3% by weight, and the flavors can be present in an amount of up to about 5% by weight, up to about 3% by weight, or up to about 1% by weight, all amounts being based on the total weight of the aerosol precursor. One specific, non-limiting example of an aerosol precursor comprises about 75% to about 80% by weight glycerol, about 13% to about 15% by weight water, about 4% to about 6% by weight propylene glycol, about 2% to about 3% by weight nicotine, and about 0.1% to about 0.5% by weight flavors. The nicotine, for example, can be a high nicotine content tobacco extract.

The amount of aerosol precursor composition that is used within the smoking article is such that the article exhibits acceptable sensory and organoleptic properties, and desirable performance characteristics. For example, it is highly preferred that sufficient aerosol precursor composition components, such as glycerin and/or propylene glycol, be employed in order to provide for the generation of a visible mainstream aerosol that in many regards resembles the appearance of tobacco smoke. Typically, the amount of aerosol-generating material incorporated into the smoking article is in the range of about 1.5 g or less, about 1 g or less, or about 0.5 g or less. The amount of aerosol precursor composition can be dependent upon factors such as the number of puffs desired per cartridge used with the smoking article. It is desirable for the aerosol-generating composition not to introduce significant degrees of unacceptable off-taste, filmy mouth-feel, or an overall sensory experience that is significantly different from that of a traditional type of cigarette that generates mainstream smoke by burning tobacco cut filler. The selection of the particular aerosol-generating material and reservoir material, the amounts of those components used, and the types of tobacco material used, can be altered in order to control the overall chemical composition of the mainstream aerosol produced by the smoking article.

Beneficially, the microheater can be positioned in intimate contact with or in close proximity to the aerosol precursor composition. In other embodiments, the microheater can be positions within the article such that the aerosol precursor composition can be delivered to the microheater for aerosolization. For example, the aerosol precursor composition (or components thereof) can be provided in liquid form so as to allow the composition to flow from one or more reservoirs to the microheater, such as via capillary action through a wick or other porous material, or by active or passive flow, which can include valve control. As such, the aerosol precursor composition may be provided in liquid form in one or more reservoirs positioned sufficiently away from the microheater to prevent premature aerosolization, but positioned sufficiently close to the microheater to facilitate transport of the aerosol precursor composition, in the desired amount, to the microheater for aerosolization. Alternatively, the aerosol precursor composition can be at least partially saturated into a substrate that can be in direct contact with the microheater such that, upon heating, the aerosol precursor composition is released from the substrate. Still further, the aerosol precursor composition can be in the form of a foam, gel, or solid. The physical state of the aerosol precursor composition can be the state of the material at ambient conditions (e.g., temperature and pressure). Such embodiments particularly can allow for precise aliquots of the aerosol precursor material to be provided in contact with a microheater so as to provide a defined number of puffs. Such embodiments are discussed in greater detail otherwise herein.

The amount of aerosol released by the inventive article can vary. Preferably, the article is configured with a sufficient amount of the aerosol precursor composition, with a sufficient amount of any further inhalable substance, and to function at a sufficient temperature for a sufficient time to release a desired content of aerosolized materials over a course of use. The content may be provided in a single inhalation from the article or may be divided so as to be provided through a number of puffs from the article over a relatively short length of time (e.g., less than 30 minutes, less than 20 minutes, less than 15 minutes, less than 10 minutes, or less than 5 minutes). For example, the article may provide nicotine in an amount of about 0.01 mg to about 0.5 mg, about 0.05 mg to about 0.3 mg, or about 0.1 mg to about 0.2 mg per puff on the article. For purposes of calculations, an average puff time of about 2 seconds can deliver a puff volume of about 5 ml to about 100 ml, about 15 ml to about 70 ml, about 20 ml to about 60 ml, or about 25 ml to about 50 ml. Such total puff volume may provide, in certain embodiments, the WTPM content previously described. A smoking article according to the invention can be configured to provide any number of puff calculable by the total amount of aerosol or other inhalable substance to be delivered divided by the amount to be delivered per puff. The one or more reservoirs can be loaded with the appropriate amount of aerosol precursor or other inhalable substance to achieve the desired number of puffs and/or the desired total amount of material to be delivered.

In further embodiments, heating can be characterized in relation to the amount of aerosol to be generated. Specifically, the article can be configured to provide an amount of heat necessary to generate a defined volume of aerosol (e.g., about 5 ml to about 100 ml, or any other volume deemed useful in a smoking article, such as otherwise described herein). In certain embodiments, the amount of heat generated can be measured in relation to a two to four second puff providing about 35 ml of aerosol at a heater temperature of about 290° C. In some embodiments, the article preferably can provide about 1 to about 50 Joules of heat per second (J/s), about 2 J/s to about 40 J/s, about 3 J/s to about 35 J/s, or about 5 J/s to about 30 J/s.

The microheater preferably is in electrical connection with the power source of the smoking article such that electrical energy can be provided to the microheater to produce heat and subsequently aerosolize the aerosol precursor composition and its various components. Such electrical connection can be permanent (e.g., hard wired) or can be removable (e.g., wherein the microheater is provided in a cartridge that can be attached to and detached from a control body that includes the power source).

Although a variety of materials for use in a smoking article according to the present invention have been described above—such as heaters, batteries, capacitors, switching components, reservoirs, dispensers, aerosol precursors, and the like, the invention should not be construed as being limited to only the exemplified embodiments. Rather, one of skill in the art can recognize based on the present disclosure similar components in the field that may be interchanged with any specific component of the present invention. For example, U.S. Pat. No. 5,261,424 to Sprinkel, Jr. discloses piezoelectric sensors that can be associated with the mouth-end of a device to detect user lip activity associated with taking a draw and then trigger heating; U.S. Pat. No. 5,372,148 to McCafferty et al. discloses a puff sensor for controlling energy flow into a heating load array in response to pressure drop through a mouthpiece; U.S. Pat. No. 5,967,148 to Harris et al. discloses receptacles in a smoking device that include an identifier that detects a non-uniformity in infrared transmissivity of an inserted component and a controller that executes a detection routine as the component is inserted into the receptacle; U.S. Pat. No. 6,040,560 to Fleischhauer et al. describes a defined executable power cycle with multiple differential phases; U.S. Pat. No. 5,934,289 to Watkins et al. discloses photonic-optronic components; U.S. Pat. No. 5,954,979 to Counts et al. discloses means for altering draw resistance through a smoking device; U.S. Pat. No. 6,803,545 to Blake et al. discloses specific battery configurations for use in smoking devices; U.S. Pat. No. 7,293,565 to Griffen et al. discloses various charging systems for use with smoking devices; US 2009/0320863 by Fernando et al. discloses computer interfacing means for smoking devices to facilitate charging and allow computer control of the device; US 2010/0163063 by Fernando et al. discloses identification systems for smoking devices; and WO 2010/003480 by Flick discloses a fluid flow sensing system indicative of a puff in an aerosol generating system; all of the foregoing disclosures being incorporated herein by reference in their entireties. Further examples of components related to electronic aerosol delivery articles and disclosing materials or components that may be used in the present article include U.S. Pat. No. 4,735,217 to Gerth et al.; U.S. Pat. No. 5,249,586 to Morgan et al.; U.S. Pat. No. 5,666,977 to Higgins et al.; U.S. Pat. No. 6,053,176 to Adams et al.; U.S. Pat. No. 6,164,287 to White; U.S. Pat. No. 6,196,218 to Voges; U.S. Pat. No. 6,810,883 to Felter et al.; U.S. Pat. No. 6,854,461 to Nichols; U.S. Pat. No. 7,832,410 to Hon; U.S. Pat. No. 7,513,253 to Kobayashi; U.S. Pat. No. 7,896,006 to Hamano; U.S. Pat. No. 6,772,756 to Shayan; US Pat. Pub. Nos. 2009/0095311, 2006/0196518, 2009/0126745, and 2009/0188490 to Hon; US Pat. Pub. No. 2009/0272379 to Thorens et al.; US Pat. Pub. Nos. 2009/0260641 and 2009/0260642 to Monsees et al.; US Pat. Pub. Nos. 2008/0149118 and 2010/0024834 to Oglesby et al.; US Pat. Pub. No. 2010/0307518 to Wang; and WO 2010/091593 to Hon. A variety of the materials disclosed by the foregoing documents may be incorporated into the present devices in various embodiments, and all of the foregoing disclosures are incorporated herein by reference in their entireties.

Although an article according to the invention may take on a variety of embodiments, as discussed in detail below, the use of the article by a consumer will be similar in scope. In particular, the article can be provided as a single unit or as a plurality of components that are combined by the consumer for use and then are dismantled by the consumer thereafter. Generally, a smoking article according to the invention can comprise a first unit that is engagable and disengageable with a second unit, the first unit comprising the resistive heating element, and the second unit comprising the electrical power source. In some embodiments, the second unit further can comprise one or more control components that actuate or regulate current flow from the electrical power source. The first unit can comprise a distal end that engages the second unit and an opposing, proximate end that includes a mouthpiece (or simply the mouthend)

with an opening at a proximate end thereof. The first unit can comprise an air flow path opening into the mouthpiece of the first unit, and the air flow path can provide for passage of aerosol formed from the resistive heating element into the mouthpiece. In preferred embodiments, the first unit can be disposable. Likewise, the second unit can be reusable.

More specifically, a smoking article according to the invention can have a reusable control body that is substantially cylindrical in shape having a connecting end and an opposing, closed end. The closed end of the control housing may include one or more indicators of active use of the article. The article further can comprise a cartridge with a connecting end that engages the connecting end of the control body and with an opposing, mouthend. To use the article, the consumer can connect a connecting end of the cartridge to the connecting end of the control body or otherwise combine the cartridge with the control body so that the article is operable as discussed herein. In some embodiments, the connecting ends of the control body and the cartridge can be threaded for a screw-type engagement. In other embodiments, the connecting ends can have a press-fit engagement.

During use, the consumer initiates heating of the resistive heating element, the heat produced by the resistive heating element aerosolizes the aerosol precursor composition and, optionally, further inhalable substances. Such heating releases at least a portion of the aerosol precursor composition in the form of an aerosol (which can include any further inhalable substances included therewith), and such aerosol is provided within a space inside the cartridge that is in fluid communication with the mouthend of the cartridge. When the consumer inhales on the mouth end of the cartridge, air is drawn through the cartridge, and the combination of the drawn air and the aerosol is inhaled by the consumer as the drawn materials exit the mouth end of the cartridge (an any optional mouthpiece present) into the mouth of the consumer. To initiate heating, the consumer may actuate a pushbutton, capacitive sensor, or similar component that causes the resistive heating element to receive electrical energy from the battery or other energy source (such as a capacitor). The electrical energy may be supplied for a pre-determined length of time or may be manually controlled. Preferably, flow of electrical energy does not substantially proceed in between puffs on the article (although energy flow may proceed to maintain a baseline temperature greater than ambient temperature—e.g., a temperature that facilitates rapid heating to the active heating temperature). In further embodiments, heating may be initiated by the puffing action of the consumer through use of various sensors, as otherwise described herein. Once the puff is discontinued, heating will stop or be reduced. When the consumer has taken a sufficient number of puffs so as to have released a sufficient amount of the inhalable substance (e.g., an amount sufficient to equate to a typical smoking experience), the cartridge can be removed from the control housing and discarded. Indication that the cartridge is spent (i.e., the aerosol precursor composition has been substantially removed by the consumer) can be provided. In some embodiments, a single cartridge can provide more than a single smoking experience and thus may provide a sufficient content of aerosol precursor composition to simulate as much as full pack of conventional cigarettes or even more.

The foregoing description of use of the article can be applied to the various embodiments described through minor modifications, which can be apparent to the person of skill in the art in light of the further disclosure provided herein. The above description of use, however, is not intended to limit the use of the inventive article but is provided to comply with all necessary requirements of disclosure of the present invention.

Referring now to FIG. 2, a smoking article 10 according to the invention generally can comprise a shell 15 and a plurality of components provided within the shell. The article can be characterized as having a mouthend 11 (i.e., the end upon which a consumer can draw to inhale aerosol from the article), and a distal end 12. The illustrated article is provided as a single unitary device (however, line A indicates an optional demarcation whereby the device can be two separate components that are joined together, either removably or permanently, such as by gluing). As will be evident from the further disclosure herein, it can be preferable for further embodiments of the article to be formed of two or more detachable units, each housing separate components of the article. The various components shown in the embodiment of FIG. 2 can be present in other embodiments, including embodiments formed of multiple units.

The article 10 according to the invention can have an overall shape that may be defined as being substantially rod-like or substantially tubular shaped or substantially cylindrically shaped. As illustrated in FIG. 2, the article has a substantially round cross-section; however, other cross-sectional shapes (e.g., oval, square, triangle, etc.) also are encompassed by the present disclosure. Such language that is descriptive of the physical shape of the article may also be applied to the individual units of the article in embodiments comprising multiple units, such as a control body and a cartridge.

The shell 15 of the smoking article 10 can be formed of any material suitable for forming and maintaining an appropriate conformation, such as a tubular shape, and for retaining therein the suitable components of the article. The shell can be formed of a single wall, as shown in FIG. 2. In some embodiments, the shell can be formed of a material (natural or synthetic) that is heat resistant so as to retain its structural integrity—e.g., does not degrade—at least at a temperature that is the heating temperature provided by the resistive heating element, as further discussed herein. In some embodiments, a heat resistant polymer or a metal (e.g., stainless steel) may be used. In other embodiments, the shell can be formed from paper, such as a paper that is substantially straw-shaped. As further discussed herein, the shell, such as a paper tube, may have one or more layers associated therewith that function to substantially prevent movement of vapor therethrough. In one example, an aluminum foil layer may be laminated to one surface of the shell. Ceramic materials also may be used.

In further embodiments, a smoking article according to the invention can include a variety of materials that can provide specific functionalities. For example, the shell 15 can include an overwrap on at least a portion thereof, such as at the mouthend of the article, and such overwrap also may be formed of multiple layers. The overwrap can be, for example, a typical wrapping paper in a cigarette. The overwrap particularly may comprise a material typically used in a filter element of a conventional cigarette, such as cellulose acetate and thus can function to provide the sensation of a conventional cigarette in the mouth of a consumer. Exemplary types of wrapping materials, wrapping material components, and treated wrapping materials that may be used in an overwrap in the present invention are described in U.S. Pat. No. 5,105,838 to White et al.; U.S. Pat. No. 5,271,419 to Arzonico et al.; U.S. Pat. No. 5,220,930 to Gentry; U.S. Pat. No. 6,908,874 to Woodhead et al.; U.S. Pat. No. 6,929,013 to Ashcraft et al.; U.S. Pat. No.

7,195,019 to Hancock et al.; U.S. Pat. No. 7,276,120 to Holmes; U.S. Pat. No. 7,275,548 to Hancock et al.; PCT WO 01/08514 to Fournier et al.; and PCT WO 03/043450 to Hajaligol et al., the disclosures of which are incorporated herein by reference in their entireties. Representative wrapping materials are commercially available as R. J. Reynolds Tobacco Company Grades 119, 170, 419, 453, 454, 456, 465, 466, 490, 525, 535, 557, 652, 664, 672, 676 and 680 from Schweitzer-Maudit International.

One or more layers of non-porous cigarette paper may be used to envelop the article (with or without the overwrap present). Examples of suitable non-porous cigarette papers are commercially available from Kimberly-Clark Corp. as KC-63-5, P878-5, P878-16-2 and 780-63-5. If desired, the overwrap (or the shell if the overwrap is absent) can comprise a resilient paperboard material, foil-lined paperboard, metal, polymeric materials, foams, nanofiber webs, or the like, and this material can be circumscribed by a cigarette paper wrap. Moreover, the article can include a tipping paper that circumscribes the article and optionally may be used to attach a filter material to the article.

As seen in the embodiment of FIG. 2, the smoking article 10 includes an electronic control component 20, a flow sensor 30, and a battery 40, and these components can be placed in a variety of orders within the article. Although not expressly shown, it is understood that the article 10 can include wiring as necessary to provide power from the battery 40 to the further components and to interconnect the components for appropriate operation of the necessary functions provided by the article. The article 10 further includes a microheater 50 as described herein. The microheater can be electrically connected to the battery 40 through appropriate wiring to facilitate formation of a closed electrical circuit with current flowing through the microheater. Further wiring (not illustrated) can be included to provide the necessary electrical connections within the article. In specific embodiments, the article 10 can be wired with an electrical circuit such that the control component 20 delivers, controls, or otherwise modulates power from the battery 40 for energizing the microheater 50 according to one or more defined algorithms, including pulse width modulation, such as already described above. Such electrical circuit can specifically incorporate the flow sensor 30 such that the article 10 is only active at times of use by the consumer. For example, when a consumer puffs on the article 10, the flow sensor detects the puff, and the control component 20 is then activated to direct power through the article such that the microheater 50 produces heat and thus provides aerosol for inhalation by the consumer. The control algorithm may call for power to the microheater 50 to cycle and thus maintain a defined temperature. The control algorithm therefore can be programmed to automatically deactivate the article 10 and discontinue power flow through the article after a defined time lapse without a puff by a consumer. Moreover, the article can include a temperature sensor to provide feedback to the control component. Such sensor can be, for example, in direct contact with the microheater 50. Alternative temperature sensing means likewise can be used, such as relying upon logic control components to evaluate resistance through the resistive heating element and correlate such resistance to the temperature of the element. In other embodiments, the flow sensor 30 can be replaced by appropriate components to provide alternative sensing means, such as capacitive sensing, as otherwise described herein. Any variety of sensors and combinations thereof can be incorporated, as already described herein. Still further, one or more control buttons 16 can be included to allow for manual actuation by a consumer to elicit a variety of functions, such as powering the article 10 on and off, turning on the microheater 50 to generate a vapor or aerosol for inhalation, or the like.

Additionally, the article can include one or more status indicators 19 positioned on the shell 15. Such indicators, as discussed above, can show the number of puffs taken or remaining from the article, can be indicative of an active or inactive status, can light up in response to a puff, or the like. Although six indicators are illustrated, more or fewer indicators can be present, and the indicators can take on different shapes and orientations and can even be simply an opening in the shell (such as for release of sound when such indicators are present).

As illustrated in the embodiment of FIG. 2, a reservoir 205 illustrated as a container is shown in proximity to the microheater 50, and a transport element 300 extends from the reservoir 205 and into sufficient proximity with the microheater such that the aerosol precursor composition can be delivered to the microheater for aerosolization. The formed aerosol is then drawn by a user through the mouthend 11 of the smoking article 10. The aerosol precursor composition that is aerosolized by the heating of the microheater can be continually replenished (e.g., through wicking or other flow of the aerosol precursor composition from the reservoir to the microheater via the transport element), or specific aliquots of the aerosol precursor composition can be delivered to the microheater on demand. The cycle continues until substantially all of the aerosol precursor composition has been aerosolized.

As seen in the embodiment of FIG. 2, the mouthend 11 of the article 10 is substantially an open cavity with the microheater 50 and the reservoir 205 disposed therein. Such open cavity provides a volume for release of the aerosol formed at the microheater. The article also includes a mouth opening 18 in the mouthend 11 to allow for withdrawal of the aerosol from the cavity. Although not expressly shown in the illustration of FIG. 2, the article can include a filter material (such as cellulose acetate or polypropylene) in the mouthend thereof to increase the structural integrity thereof and/or to provide filtering capacity, if desired, and/or to provide resistance to draw. For example, an article according to the invention can exhibit a pressure drop of about 50 to about 250 mm water pressure drop at 17.5 cc/second air flow. In further embodiments, pressure drop can be about 60 mm to about 180 mm or about 70 mm to about 150 mm. Pressure drop value may be measured using a Filtrona Filter Test Station (CTS Series) available from Filtrona Instruments and Automation Ltd or a Quality Test Module (QTM) available from the Cerulean Division of Molins, PLC. To facilitate air flow through the article, an air intake 17 can be provided and can substantially comprise an aperture in the shell 15 that allows for air flow into the interior of the article. A plurality of air intakes can be provided, and the air intakes can be positioned at any location upstream from the mouthend of the article such that air from the air intake can mingle with and facilitate removal of the formed aerosol from the cavity and through the opening in the mouthend of the article.

In other embodiments, the reservoir can be a substrate adapted to retain the aerosol precursor composition—e.g., can be a layer of material that is at least partially saturated with the aerosol precursor composition. Such layer can be absorbent, adsorbent, or otherwise porous so as to provide the ability to retain the aerosol precursor composition. As such, the aerosol precursor composition can be characterized as being coated on, adsorbed by, or absorbed in a carrier material (or substrate), and this can form all or part of a substrate material that also can carry one or more microheaters. The carrier material can be positioned within the article to be in substantial contact with one or more microheaters (i.e., a plurality of microheaters).

As seen in FIG. 2, the reservoir 205 can be a container formed of one or more walls defining an interior volume wherein the aerosol precursor composition or one or more components thereof is stored. The container can be formed of substantially rigid walls, and transfer of the aerosol precursor material therefrom can proceed by an active or passive transfer method as discussed herein. Alternately, the container can be formed of substantially flexible material such that the container can be compressed (i.e., a bladder reservoir) to facilitate transfer of the aerosol precursor material therefrom.

In preferred embodiments, the article can take on a size that is comparative to a cigarette or cigar shape. Thus, the article may have a diameter of about 5 mm to about 25 mm, about 5 mm to about 20 mm, about 6 mm to about 15 mm, or about 6 mm to about 10 mm. Such dimension may particularly correspond to the outer diameter of the shell.

The smoking article 10 in the embodiment illustrated in FIG. 2 can be characterized as a disposable article. Accordingly, it can be desirable for the reservoir containing the aerosol precursor composition in such embodiments to include a sufficient amount of aerosol precursor composition so that a consumer can obtain more than a single use of the article. For example, the article can include sufficient aerosolizable and/or inhalable materials such that the article can provide a number of puffs substantially equivalent to the number of puffs (of about two to four seconds duration) available from a plurality of conventional cigarettes—e.g., 2 or more, 5 or more, 10 or more, or 20 or more conventional cigarettes. More particularly, a disposable, single unit article according to the embodiment of FIG. 2 can provide about 20 or more, about 50 or more, or about 100 or more puffs, a single puff being measured as already described herein.

In some embodiments, an article as described herein can comprise two units that are attachable and detachable from each other. For example, FIG. 3 shows a smoking article 10 according to one embodiment that is formed of a control body 80 and a cartridge 90. In specific embodiments, the control body may be referred to as being reusable, and the cartridge may be referred to as being disposable. In some embodiments, the entire article may be characterized as being disposable in that the control body may be configured for only a limited number of uses (e.g., until a battery power component no longer provides sufficient power to the article) with a limited number of cartridges and, thereafter, the entire article 10, including the control body, may be discarded. In other embodiments, the control body may have a replaceable battery such that the control body can be reused through a number of battery exchanges and with many cartridges. The article 10 may be rechargeable and thus may be combined with any type of recharging technology, including connection to a typical electrical outlet, connection to a car charger (i.e., cigarette lighter receptacle), and connection to a computer, such as through a USB cable.

The control body 80 and the cartridge 90 are specifically configured so as to engage one another and form an interconnected, functioning device. As illustrated in FIG. 3, the control body 80 includes a proximal attachment end 13 that includes a projection 82 having a reduced diameter in relation to the control body. The cartridge includes a distal attachment end 14 that engages the proximal engagement end of the control body 80 to provide the smoking article 10 in a functioning, usable form. In FIG. 3, the control body projection 82 includes threads that allow the cartridge 90 to screw onto the control body 80 via corresponding threads (not visible in FIG. 3) in the distal attachment end of the cartridge. Thus, the distal attachment end of the cartridge 90 can include an open cavity for receiving the control body projection 82. Although a threaded engagement is illustrated in FIG. 3, it is understood that further means of engagement are encompassed, such as a press-fit engagement, a magnetic engagement, or the like.

Positioning of the microheaters within the article can vary. In certain embodiments, one or more microheaters can be attached to a substrate, which can be permanently incorporated into the smoking article or can be removable from the smoking article. Examples of such embodiments are shown in FIG. 4 and FIG. 5. Referring first to FIG. 4, a substrate 600 is shown having a plurality of microheaters 50 attached thereto. The microheaters can be characterized as being attached to a surface of the substrate, embedded within the substrate, or recessed within the substrate (e.g., within a well or other depression formed within the substrate, as otherwise described below). The substrate can be formed of any material suitable for use in a smoking article and, preferably, can comprise an electrically insulating material. The substrate material can include, but is not limited to, polymeric materials, particularly heat resistant polymers, paper, cardboard, ceramics, and the like. While five microheaters are shown in the illustrated embodiment, it is understood that more or fewer microheaters can be utilized on a single substrate in light of the relatively small size of the microheaters. Moreover, a plurality of substrates can be used, each substrate comprising one or more microheaters thereon. Although not expressly shown, it is understood that the substrate(s) can include any electrical wiring useful to form the electrical connection necessary for the microheaters to be powered by the electrical power source. Likewise, the substrate can include electrical contacts useful for forming an electrical connection with the plug or other electrical components of the article. For example, each individual microheater can be wired to a common electrical contact on the substrate.

The aerosol precursor composition (or one or more components thereof) can be stored in a reservoir present in or on the substrate 600. For example, the perimeter of the substrate can include one or more containers, porous materials, or the like useful for storing one or more components of the aerosol precursor composition therein, and one or more transport elements can be present to transport aerosol precursor composition from the reservoir to the microheaters. Thus, the microheater(s), reservoir(s), and transport element(s) can be characterized as being self-contained on a single substrate or on the same substrate. In other embodiments, a transport element can be absent.

More specifically, FIG. 5 illustrates one embodiment of the disclosed device when viewed as a cross-section of the substrate of FIG. 4 across line A-A. In this embodiment, the microheaters 50 are recessed a distance within the substrate 600. As such, the substrate can be described as comprising one or more heater wells 610. An individual microheater is then positioned within the heater well, and all or part of the remaining well volume can be filled with the aerosol precursor composition 700 (or a component thereof). The depth of the well can vary depending upon the volume of aerosol precursor material to be used. In such embodiments, the aerosol precursor composition beneficially can be provided in a form such that the aerosol precursor composition does not significantly dislocate from the heater well 610, such as being in the form of a gel or foam or other solid or semi-solid material. The gel (or aerosol precursor in another form) can be coated on the microheater. Thus, the microheater can be characterized as being operatively positioned within the smoking article to be substantially in contact with the aerosol precursor composition. Such description can apply to further alignments of the aerosol precursor composition and the microheaters, as otherwise described herein.

As illustrated in FIG. 5, the heater wells with the microheaters and aerosol precursor material positioned within are present on only one side of the substrate. In other embodiments, the wells can be present on both sides of the substrate. In addition, other substrate configurations are encompassed, such as three-sided (e.g., having a triangular cross-section), four-sided (e.g., having a square, rectangular, trapezoidal, or other similar cross-section), or having a multi-arm cross section (e.g., three arms, four arms, or more). Such configurations can provide sufficient surface area to provide a relatively large number of microheaters on a single substrate. For example, with a substrate having a four arm cross section (e.g., a cross shape), up to eight surfaces are made available for placement of microheaters. In other embodiments, the substrate can be in the form of a cylinder, and the microheaters can be circumferentially distributed on one or both of the interior and exterior surfaces of the cylindrically shaped substrate.

Providing a relatively large number of microheaters can be particularly beneficial when it is desired to separately heat two or more components of the aerosol precursor composition. Specifically, referring to FIG. 5, one heater well 610 can include one component of a precursor composition (e.g., a polyol), and a separate heater well can include a different component, such as a flavorant or a medicament. The device then can include controls adapted to activate the microheaters corresponding to the different components of the aerosol precursor composition according to different algorithms. For example, different microheaters may heat to different temperatures, heat for different lengths of time, or heat in a specific sequence. Further, specific microheaters can be automatically activated by the control components in response to activation of the device (e.g., upon activation of a pressure sensor indicating draw on the device), and other microheaters can be manually controlled (e.g., by a push-button). For example, one or more microheaters can be adapted for heating a specific flavorant (e.g., menthol), and the user of the device can use a manual control to only deliver the flavorant when desired. As can be seen from the foregoing, the utilization of multiple microheaters can provide for a great variety of customizations of the heating profiles of the device and customization of the aerosol composition that is delivered in individual puffs on the device.

Even further configurations of microheaters in or on a substrate can be encompassed by the present disclosure. For example, a plurality of microheaters can be combined with a substrate to provide a bank of heaters. As illustrated in the embodiment of FIG. 6, a bank of microheaters 50 can be provided within a substrate. In this embodiment, the substrate 600 comprises a first layer 603 and a second layer 605, and the microheaters can be sandwiched between the two layers. One of the first layer and the second layer can comprise a porous material that can function as a reservoir for an aerosol precursor composition (or a component thereof), and the precursor composition (or one or more components thereof) can be stored substantially across the entire area of the layer or can be deposited only in one or more specific areas corresponding to one or more of the microheaters. As such, an individual microheater can be activated to aerosolize an overall aerosol precursor composition in the area proximate the microheater. Alternately, an individual microheater can be activated to aerosolize a specific component of an aerosol precursor composition in the area proximate the microheater.

In further embodiments, a substrate can be provided that comprises an aerosol precursor composition (or one or more components thereof), and one or more microheaters can be provided integral to a device as described herein. More specifically, microheaters can be positioned interior to a smoking article as discussed herein, and a substrate comprising an aerosol precursor composition can be positioned within the article such that the substrate is in substantial contact with the bank of microheaters or a single microheater. The substrate can be replaceable, if desired, such that an article comprising a bank of microheaters can be re-used by simply discarding a depleted substrate and inserting a fresh substrate with aerosol precursor composition thereon into the article. One such embodiment is illustrated in FIG. 7.

As seen in FIG. 7, there is illustrated an embodiment of an electronic smoking article 10 that is essentially a single, continuous body 150 with a hinged door 101. When in an open position, the door reveals an aerosolization cavity lined with a series of microheaters 50. In the illustrated embodiment, the microheaters are provided on the interior surface of the hinged door 101 and on a surface interior to the article. For use of the article, a substrate 600 comprising an aerosol precursor composition is placed within the aerosolization cavity of the article. The substantially flat substrate is then positioned within the cavity and the hinged door 101 is closed such that the top and bottom surfaces of the substrate 600 are each in substantial contact with the series of microheaters. After use of the article has substantially depleted the substrate of the aerosol precursor composition, the hinged door can be opened, and the substrate can be removed and replaced with a new substrate comprising an aerosol precursor composition. In other embodiments, the microheaters can be positioned only on the interior of the hinged door or only on the interior surface of the aerosolization cavity. The series of microheaters can be configured to heat the substrate according to any algorithm desired, such as already described herein.

In some embodiments, the microheaters can be characterized as being serially aligned. Alternately, the microheaters can be provided in one or more different spatial alignments. The specific alignment of the microheaters can be predetermined to heat specific portions of a substrate in a specific order and/or to simultaneously heat two or more different portions of the substrate at the same time. As such, the combination of a plurality of microheaters in the disclosed device can be characterized as being a heater array.

Although the substrate 600 in FIG. 7 is illustrated as being a substantially flattened rectangle, other shapes are envisioned. For example, the substrate can be cylindrical. In other embodiments, the substrate can be a substantially elongated member having a defined cross-section, such as a square, a circle, a triangle, or the like, and the dimensions of the substrate can vary as desired so long as the substrate is sized to fit within an aerosolization cavity within the article so as to be in substantial contact with one or a plurality of microheaters. Moreover, the number of microheaters lining the aerosolization cavity can vary. Similarly, as the shape and dimensions of the substrate are varied, the shape and dimensions of the aerosolization cavity within the article can vary accordingly, and the aerosolization cavity can be substantially identical in shape and dimensions to the substrate. In still other embodiments, the hinged door 101 can be positioned anywhere along of the article 10 so as to provide ease of access to the aerosolization cavity. For example, the mouthend 11 of the article can be a hinged door such that an entire section of the mouthend of the article hinges open to allow access to the aerosolization cavity for placement and removal of the substrate 600. Such structure, for example, can limit direct access to the microheaters by a user.

In certain embodiments, the reservoir used to store the aerosol precursor composition can be a container (e.g., a bladder), and the article can be adapted for metering defined aliquots of the aerosol precursor composition from the container. Mechanical components (e.g., a plunger and a drive mechanism, such as a spring) can be included and can be electronically controlled by the microcontroller or similar component of the article. Micro-pump devices particularly can be used. Associated components also can provide indication of the fluid fill status of the reservoir. Similarly, passive microfluidic devices can be used for transfer of the aerosol precursor composition or one or more components thereof to the microheater. Such devices can be particularly useful as they do not necessarily require a separate power source, and the control exerted by the device can be based, at least in part, on energy drawn from the fluid being transferred or can be based on surface effects, such as surface tension, selective hydrophobic/hydrophilic control, and the like. Examples of passive microfluidic devices can be found, for example, in the Springer Handbook of Nanotechnology, edited by Bharat Bhushan, section 19.3, Smart Passive Microfluidic Devices, Nov. 29, 2006, p. 532-540, the disclosure of which is incorporated herein by reference in its entirety.

The reservoir containing the aerosol precursor composition can be in fluid communication with a microheater as discussed herein via one or more further components. For example, the container can be in contact with a dispenser that facilitates movement of the liquid aerosol precursor composition out of the container and onto the microheater. The dispenser can be connected to the container via an appropriate passageway, such as tubing of suitable dimensions, or other transport element. If desired, one or more valves can be included in that opening of the valve (e.g., via electronic control by the microcontroller or like component of the article) can allow passage of the liquid aerosol precursor composition out of the reservoir or through the passageway, or out of the dispenser and onto the microheater. Such valve mechanism can be present in addition to or in place of other mechanical components that actively displace the aerosol precursor composition from the container.

The dispenser can dispense the aerosol precursor composition onto the microheater, which can be present on a separate substrate. In some embodiments, the dispenser can be monolithic with or otherwise attached to a microheater substrate, and the dispenser can include various components for maintaining the aerosol precursor composition proximate the microheater for aerosolization thereof and for releasing the formed aerosol.

The microheater also can be provided as part of a layered structure which can effectively be characterized as an atomizer apparatus. For example, FIG. 8 illustrates an atomizer 800 that is a layered structure forming an open cavity overlying a microheater as discussed herein. As such, the microheater can be characterized as being integral with the atomizer. Specifically, the atomizer 800 comprises a supporting layer 510 with an electrically conductive layer 520 thereon. A protective layer 540 is shown overlying the electrically conductive layer. Above the protective layer is an atomizing chamber 810 that is an open volume defined by an atomizing chamber wall 820, a chamber cover 830, and the microheater (particularly the protective layer of the microheater). The chamber cover and the protective layer are shown as partially transparent for ease of illustration, but opaque or translucent materials likewise can be used. A plurality of openings 840 are provided in the atomizing chamber wall to allow passage of vaporized aerosol precursor material out of the atomizer. Preferably, the openings are sized such that vapor will pass therethrough but that liquid aerosol precursor composition will not pass therethrough. A liquid passage 850 connects the atomizer to a reservoir, and the liquid passage opens into the atomizing chamber to allow liquid precursor material to pass into the chamber for vaporization. The liquid passage can be tubing having a diameter of about 250 μm to about 1,000 μm, about 300 μm to about 750 μm, or about 400 μm to about 600 μm. As discussed herein, passage of the liquid can be through active or passive means. When passive means are employed, the liquid may freely pass into the chamber where it awaits vaporization but does not exit through the openings 840. When the heater is activated, the liquid is vaporized and exits the chamber through the openings, and the chamber is backfilled by the entry of additional liquid precursor material. The atomizing chamber is preferably sized such that substantially all of the liquid present in the chamber as a single time is completely vaporized for removal therefrom. If desired, means to prevent passage of formed vapor from the atomizing chamber into the liquid passage can be provided. For example, a ball valve (not shown) can be present at the opening of the liquid passage into the atomizing chamber. The layers of the atomizer can be bonded together, such as with a eutectic metallic bond.

Terminals 530 extending from the electrically conductive layer 520 provide for an electrical connection of the microheater (specifically the electrically conductive material) with the further electrical components of the article. The chamber wall and the chamber cover can be formed of any suitable material that is heat resistant and chemically non-reactive with the aerosol precursor composition. For example, the chamber wall can be formed of silicon, and the chamber cover can be formed of glass; however, other materials discussed herein, such as for use as the supporting layer and/or the protective layer can be used to form, independently, the chamber wall and the chamber cover.

Although a structure discussed above can be particularly beneficial, it is not required, and the above-described components rather can be combined in a variety of fashions. For example, the atomizer can be formed such that the microheater is in thermal connection with the atomizing chamber formed of one or more walls. The chamber can be adapted to receive an aliquot of an aerosol precursor composition, such as through an opening in the chamber wall. The wall or walls defining the chamber (including a cover, as applicable) preferably includes one or more openings adapted for the exit of vapor or aerosol from the chamber and an opening adapted for infiltration of air into the chamber. In certain embodiments, the openings adapted for the exit of vapor or aerosol can also be used for infiltration of air into the chamber.

Another exemplary embodiment is illustrated in FIG. 9, which shows an atomizer 800 including a supporting layer 510, an atomizing chamber wall 820, and an atomizer chamber cover 830. The atomizing chamber, the electrically conductive layer, and the protective layer are not visible in this view. In this embodiment, the cover 830 includes a plurality of cover openings 845, and the chamber wall is continuous around the perimeter of the atomizer. A liquid passage 850 connects the atomizer to a reservoir, and the liquid passage opens into the atomizing chamber to allow liquid precursor material to pass into the chamber for vaporization. In this embodiment, the cover can be formed of a metal mesh, and the cover openings are sized such that vaporized aerosol precursor composition can pass therethrough but that liquid aerosol precursor composition cannot pass therethrough. The cover alternately can be formed of other suitable materials, such as ceramics, high temperature polymers, silicon, glass, and the like. The atomizer cover and the atomizer chamber wall beneficially can be formed as a monolithic structure, such as through use of suitable photolithography techniques. Specifically, the cover can be bonded to a blank of the material used for the atomizing chamber wall, and etching can be used to remove material necessary to from the walls and leave a chamber of desired dimensions. The chamber walls can then be bonded to the supporting layer or a cover layer overlying the electrically conductive layer on the supporting layer.

Because of the size of the microheater itself, the atomizer likewise can be of relatively small dimensions. For example, the atomizer can have an overall length of about 2 mm to about 12 mm, about 3 mm to about 10 mm, or about 4 mm to about 8 mm and an overall width of about 1 mm to about 7 mm, about 1.5 mm to about 6 mm, or about 2 mm to about 5 mm. The atomizing chamber can have a volume of about 0.2 ml to about 1 ml, about 0.3 ml to about 0.9 ml, or about 0.4 ml to about 0.8 ml. One or a plurality of atomizers can be included in the article, and the atomizers can be in fluid communication with one or a plurality of reservoirs (which can include an overall aerosol precursor composition or specific components of an aerosol precursor composition). As such, the article can be characterized including an aerosol precursor composition that comprises of a plurality of separate components, a plurality of reservoirs separately containing the separate components of the aerosol precursor composition, and a plurality of atomizers or chambers adapted to receive aliquots of the separate components of the aerosol precursor composition from the reservoirs.

An atomizer as described above particularly can be incorporated into a cartridge of a smoking article as described herein. For example, the atomizer can be connected via the liquid passage (e.g., a stainless steel tube) to a reservoir, such as a walled container. The reservoir can maintain a positive pressure on the aerosol precursor composition therein so that liquid aerosol precursor composition continuously fills the chamber of the atomizer after vaporization during use. In one embodiment, the reservoir can include a plunger that is biased, such as with a spring, to maintain the positive pressure on the liquid aerosol precursor composition in the reservoir. Desirably, attached to the plunger can be an indicator that moves with the plunger. A smoking article thus can include a window in the body thereof through which the indicator is visible. As the liquid aerosol precursor composition is depleted, the plunger moves in a defined direction. As such, the indicator likewise moves in the same direction. The window can be positioned such that, as the indicator moves past the window, indication of the fill status of the liquid aerosol precursor composition can be displayed. For example color coding can be utilized to indicate fill status with one or more different colors appearing in the window as the liquid is depleted. Likewise, a tapered indicator can be used to indicate fill status with the indicator moving from non-tapered to completely tapered as the liquid is depleted. In other embodiments, a digital screen may be provided rather than a window, and mechanical motion of the plunger can be electronically converted to an appropriate signal to indicate fill status on the digital screen. Similarly, a series of LEDs can be used to indicate fill status.

Further to the above, it should be noted that a variety of reservoirs can be utilized per the various embodiments described above. For example, the reservoir can be a container, such as a bottle, in which the aerosol precursor composition is stored. The container can be substantially impermeable in relation to the aerosol precursor such that the material cannot escape through the walls of the container. In such embodiments, an opening can be provided for passage of the aerosol precursor composition therefrom. The term "bottle" is meant to generally encompass any container having walls and at least one opening. A tube or other conduit can be used for passage of the aerosol precursor composition out of the bottle and through the tube or other conduit. Such passage also can occur via capillary action. Alternately, passive flow of the liquid from the bottle can be controlled with an appropriate valve mechanism that can be opened to allow flow of the aerosol precursor composition when the smoking article is in use and to prevent flow of the aerosol precursor composition when the smoking article is not in use. Active flow mechanisms incorporating micropump devices also are envisioned for use according to the present invention. Such container can be formed of any suitable material that is not substantially reactive with any components of the aerosol precursor composition, such as glass, metal, low- or no-porosity ceramics, plastics, and the like.

In some embodiments, a reservoir can be a woven or non-woven fabric or another mass of fibers suitable for retaining the aerosol precursor composition (e.g., through absorption, adsorption, or the like) and allowing wicking away of the precursor composition for transport to the microheater. Such reservoir layers can be formed of natural fibers, synthetic fibers, or combinations thereof. Non-limiting examples of useful materials include cotton, cellulose, polyesters, polyamides, polylactic acids, combinations thereof, and the like. Similarly, reservoirs can be formed of ceramics, other porous materials, sintered materials, and the like. A smoking article according to the present invention can include one reservoir or a plurality of reservoirs (e.g., two reservoirs, three reservoirs, four reservoirs, or even more). As discussed herein, a reservoir can effectively be a substrate containing one or more microheaters. Such substrates can be formed of porous materials, such as described above.

A wick can be used in certain embodiments to transport one or more aerosol precursor compositions from a reservoir to a microheater in the smoking article. A wick for use according to the invention thus can be any material that provides sufficient wicking action to transport one or more components of the aerosol precursor composition to the microheater. Non-limiting examples include natural and synthetic fibers, such as cotton, cellulose, polyesters, polyamides, polylactic acids, glass fibers, combinations thereof, and the like. Other exemplary materials that can be used in wicks include metals ceramics, and carbonized filaments (e.g., a material formed of a carbonaceous material that has undergone calcining to drive off non-carbon components of the material). Wicks further can be coated with materials that alter the capillary action of the fibers, and the fibers used in forming wicks can have specific cross-sectional shape and can be grooved so as to alter the capillary action of the fibers. Fibers used in forming wicks can be provided singly, bundled, as a woven fabric (including meshes and braids), or as a non-woven fabric. Porosity of the wick material also can be controlled to alter the capillary action of the wick including controlling average pore size and total porosity, controlling wick geometry (or fiber geometry), and controlling surface characteristics. Separate wicks also can have different lengths. The term "wick" is also intended to encompass capillary tubes, and any combination of elements providing the desired capillary action can be used.

Typically, the aerosol precursor composition utilized in the smoking article will be formed of a first component and at least a second, separate component. Thus, the aerosol precursor composition can be formed of a plurality of components, such as two separate components, three separate components, four separate components, five separate components, and so on. In various embodiments, separate components of the aerosol precursor composition can be separately transported to separate microheaters. Separate transport can apply in this regard to each individual component of the aerosol precursor composition or any combination of the individual components. In some embodiments, two or more components of the aerosol precursor composition can be stored in the same reservoir and still be separately transported to separate microheaters or to the same microheater. Various combinations of one or more reservoirs, one or more transport elements, and one or more microheaters, all having various designs and formed of various materials, may be used to achieve controlled rate of transport and heating of the aerosol precursor composition components.

Beneficially, utilizing separate transport of separate components of the aerosol precursor composition to separate heating elements can allow for the separate components to be heated to different temperatures to provide a more consistent aerosol for draw by a user. Although the aerosolization temperature of separate heaters can be substantially the same, in some embodiments, the aerosolization temperature of the separate heaters can differ by 2° C. or greater, 5° C. or greater, 10° C. or greater, 20° C. or greater, 30° C. or greater, or 50° C. or greater.

In addition to the foregoing, the control body and cartridge can be characterized in relation to overall length. For example, the control body can have a length of about 50 mm to about 110 mm, about 60 mm to about 100 mm, or about 65 mm to about 95 mm. The cartridge can have a length of about 20 mm to about 60 mm, about 25 mm to about 55 mm, or about 30 mm to about 50 mm. The overall length of the combined cartridge and control body (or the overall length of a smoking article according to the invention formed of a single, unitary shell) can be approximately equal to or less than the length of a typical cigarette—e.g., about 70 mm to about 130 mm, about 80 mm to about 125 mm, or about 90 mm to about 120 mm.

Although the cartridge and the control body can be provided together as a complete smoking article or medicament delivery article generally, the components also may be provided separately. For example, the invention also encompasses a disposable unit for use with a reusable smoking article or a reusable medicament delivery article.

In specific embodiments, a disposable unit or cartridge according to the invention can be substantially identical to a cartridge as described above in relation to the appended figures. Thus, a disposable cartridge can comprise a substantially tubular shaped cartridge shell having a distal attachment end configured to engage a reusable smoking article or medicament delivery article and an opposing mouthend configured to allow passage of a formed vapor and any further inhalable materials to a consumer. The cartridge shell can define an interior cartridge space that includes additional cartridge components, particularly one or more microheaters.

Although the various figures described herein illustrate the control body and the cartridge in a working relationship, it is understood that the control body and the cartridge can exist as individual devices. Accordingly, any discussion otherwise provided herein in relation to the components in combination also should be understood as applying to the control body and the cartridge as individual and separate components.

In another aspect, the invention can be directed to kits that provide a variety of components as described herein. For example, a kit can comprise a control body with one or more cartridges. A kit further can comprise a control body with one or more charging components. A kit further can comprise a control body with one or more batteries. A kit further may comprise a control body with one or more cartridges and one or more charging components and/or one or more batteries. In further embodiments, a kit may comprise a plurality of cartridges. A kit further may comprise a plurality of cartridges and one or more batteries and/or one or more charging components. The inventive kits further can include a case (or other packaging, carrying, or storage component) that accommodates one or more of the further kit components. The case could be a reusable hard or soft container. Further, the case could be simply a box or other packaging structure.

In further embodiments, the present disclosure further encompasses a method of forming an aerosol in a smoking article. Specifically, the method can comprise initiating current flow from an electrical power source within the smoking article to a microheater within the smoking article so as to cause heating of the microheater, which heats an aerosol precursor composition.

In certain embodiments, the smoking article utilized in the method can comprise a plurality of microheaters. Moreover, two or more of the microheaters can be simultaneously heated. Still further, the aerosol precursor composition can comprise two or more separate components, and the separate components of the aerosol precursor composition can be separately heated by the simultaneously heated microheaters. More specifically, the simultaneously heated microheaters can receive current flow from the electrical power source under different conditions such that the microheaters are heated to different temperatures or are heated for different amounts of time. If desired, two or more of the microheaters can be heated serially (i.e., in a defined sequence or pattern).

In further embodiments of the method, the aerosol precursor composition can be coated on, adsorbed by, or absorbed in a carrier material (i.e., a substrate), and prior to the step of initiating current flow, the method can include inserting the carrier material into the smoking article. Similarly, the microheaters can be attached to a substrate, and prior to the step of initiating current flow, the method can comprise inserting the substrate into the smoking article. In specific embodiments, the aerosol precursor composition can be coated on the microheaters attached to the substrate. In other embodiments, the method can include initiating flow of the aerosol precursor composition from a reservoir to a chamber that is in thermal connection with the microheater so as to heat the aerosol precursor composition within the chamber.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed herein and that modifications and other embodiments are intended to be included within the scope of the appended claims. Although specific terms are employed herein, they are used in a generic and descriptive sense only and not for purposes of limitation.

The invention claimed is:

1. An aerosol forming article comprising:

a housing;

a reservoir within the housing configured to store a liquid aerosol precursor composition; and an atomizer unit that is receivable in the housing, the atomizer unit comprising:

an atomizing chamber defined by at least one atomizing chamber wall;

a heater positioned in the atomizing chamber;

a silicon-based component arranged to overlie the heater and be in direct contact therewith;

at least one opening formed in a component of the atomizer unit and configured for passage therethrough of vapor formed by vaporization of the liquid aerosol precursor composition, wherein the component in which the at least one opening is formed is an atomizing chamber cover; and a plurality of electrical terminals extending through the at least one atomizing chamber wall from within the atomizing chamber.

2. The aerosol forming article of claim 1, further comprising a mouthend defined at an end of the housing and including an opening for passage therethrough of the vapor.

3. The aerosol forming article of claim 1, wherein a portion of the atomizing chamber wall at least partially defines a liquid passage for passage of the liquid aerosol precursor composition from the reservoir to the heater positioned in the atomizing chamber.

4. The aerosol forming article of claim 1, wherein the heater positioned in the atomizing chamber is present on a supporting component.

5. The aerosol forming article of claim 4, wherein the supporting component is formed of a porous material.

6. The aerosol forming article of claim 1, wherein the atomizing chamber cover is arranged with the at least one atomizing chamber wall so that the liquid aerosol precursor composition will not pass through the at least one opening formed in the atomizing chamber cover.

7. The aerosol forming article of claim 1, wherein the plurality of electrical terminals are arranged for forming an electrical connection between the heater and further electrical components of the aerosol forming article.

8. The aerosol forming article of claim 1, wherein the housing defines a substantially open cavity in which the atomizer unit is receivable.

9. The aerosol forming article of claim 1, wherein the housing defines a cartridge that is configured for engagement with a control body.

10. The aerosol forming article of claim 9, wherein the cartridge is configured for a press-fit engagement with the control body.

11. The aerosol forming article of claim 1, wherein the silicon-based component comprises at least silicon and carbon.

* * * * *